(12) United States Patent
Gannon et al.

(10) Patent No.: US 11,976,455 B2
(45) Date of Patent: May 7, 2024

(54) OIL CONTAINMENT SYSTEM AND METHOD

(71) Applicant: Solidification Products International, Inc., Northford, CT (US)

(72) Inventors: William J. Gannon, Northford, CT (US); Paul Melaccio, Clinton, CT (US); Chester Perrotti, Northford, CT (US)

(73) Assignee: Solidification Products International, Inc., Northford, CT (US)

( * ) Notice: Subject to any disclaimer, the term of this patent is extended or adjusted under 35 U.S.C. 154(b) by 129 days.

(21) Appl. No.: 17/732,158

(22) Filed: Apr. 28, 2022

(65) Prior Publication Data

US 2022/0349169 A1    Nov. 3, 2022

Related U.S. Application Data

(60) Provisional application No. 63/181,717, filed on Apr. 29, 2021.

(51) Int. Cl.
*F16N 31/00*    (2006.01)
*B01D 17/02*    (2006.01)
(Continued)

(52) U.S. Cl.
CPC ........ *E03F 5/0404* (2013.01); *B01D 17/0202* (2013.01); *E03F 5/16* (2013.01); *F16M 5/00* (2013.01); *F16N 31/00* (2013.01)

(58) Field of Classification Search
CPC ...... E03F 5/0404; E03F 5/16; B01D 17/0202; F16M 5/00; F16N 31/00
See application file for complete search history.

(56) References Cited

U.S. PATENT DOCUMENTS 5,149,050 A * 9/1992 Smith ..................... F16M 5/00
                                              248/680
5,529,436 A    6/1996 Meyers
(Continued)

FOREIGN PATENT DOCUMENTS

EP         3379000 A1    9/2018

OTHER PUBLICATIONS

International Search Report and The Written Opinion dated Sep. 14, 2022 for PCT Application No. PCT/US2022/026818.

*Primary Examiner* — Kyle Armstrong
(74) *Attorney, Agent, or Firm* — DeLio Peterson & Curcio LLC; Brian G. Schlosser

(57) ABSTRACT

An oil containment system and installation method for a transformer mounted on a transformer pad, comprising a plurality of interlocking open-topped containment units. Each of the containment units having a base, a sump formed with two vertically-aligned sidewalls, a first end, and a second end. The sidewalls have support struts extending across the sump and a grate member. At least one of the ends includes a connecting member or a receiving member, the connecting member sized to be placed within the receiving member sized to interlock adjacent containment units. A discriminative outlet is disposed within an opening in the sidewall and includes a filtration media for adsorbing oil from a fluid and subsequently blocking oil flow through the discriminative outlet. The interlocking containment units are secured to the transformer pad around a peripheral edge to restrict the migration of oil to an outside portion of said oil containment system.

19 Claims, 18 Drawing Sheets

(51) Int. Cl.
*E03F 5/04* (2006.01)
*E03F 5/16* (2006.01)
*F16M 5/00* (2006.01)

(56) References Cited

U.S. PATENT DOCUMENTS

| | | | | |
|---|---|---|---|---|
| 5,743,674 | A * | 4/1998 | Healy | E02B 3/108 |
| | | | | 405/52 |
| 5,820,297 | A * | 10/1998 | Middleton | E02B 7/00 |
| | | | | 405/114 |
| 6,503,390 | B1 | 1/2003 | Gannon | |
| 8,979,433 | B2 * | 3/2015 | Shaw | B65D 90/24 |
| | | | | 405/116 |
| 9,309,047 | B2 * | 4/2016 | Shaw | E02B 7/02 |
| 9,352,903 | B1 * | 5/2016 | Murray | B65D 90/24 |
| 10,745,195 | B1 * | 8/2020 | Murray | B65D 90/24 |
| 2002/0021939 | A1 | 2/2002 | Allard | |
| 2009/0324335 | A1 * | 12/2009 | Fossen | B65D 90/24 |
| | | | | 405/116 |
| 2009/0324336 | A1 * | 12/2009 | Fossen | B65D 90/24 |
| | | | | 405/116 |
| 2010/0126623 | A1 * | 5/2010 | Denning | B65D 90/24 |
| | | | | 141/234 |
| 2014/0030022 | A1 * | 1/2014 | Nicholas | B65D 90/24 |
| | | | | 405/52 |
| 2020/0256026 | A1 * | 8/2020 | Ackles | C02F 1/40 |
| 2020/0406173 | A1 | 12/2020 | Gannon et al. | |

\* cited by examiner

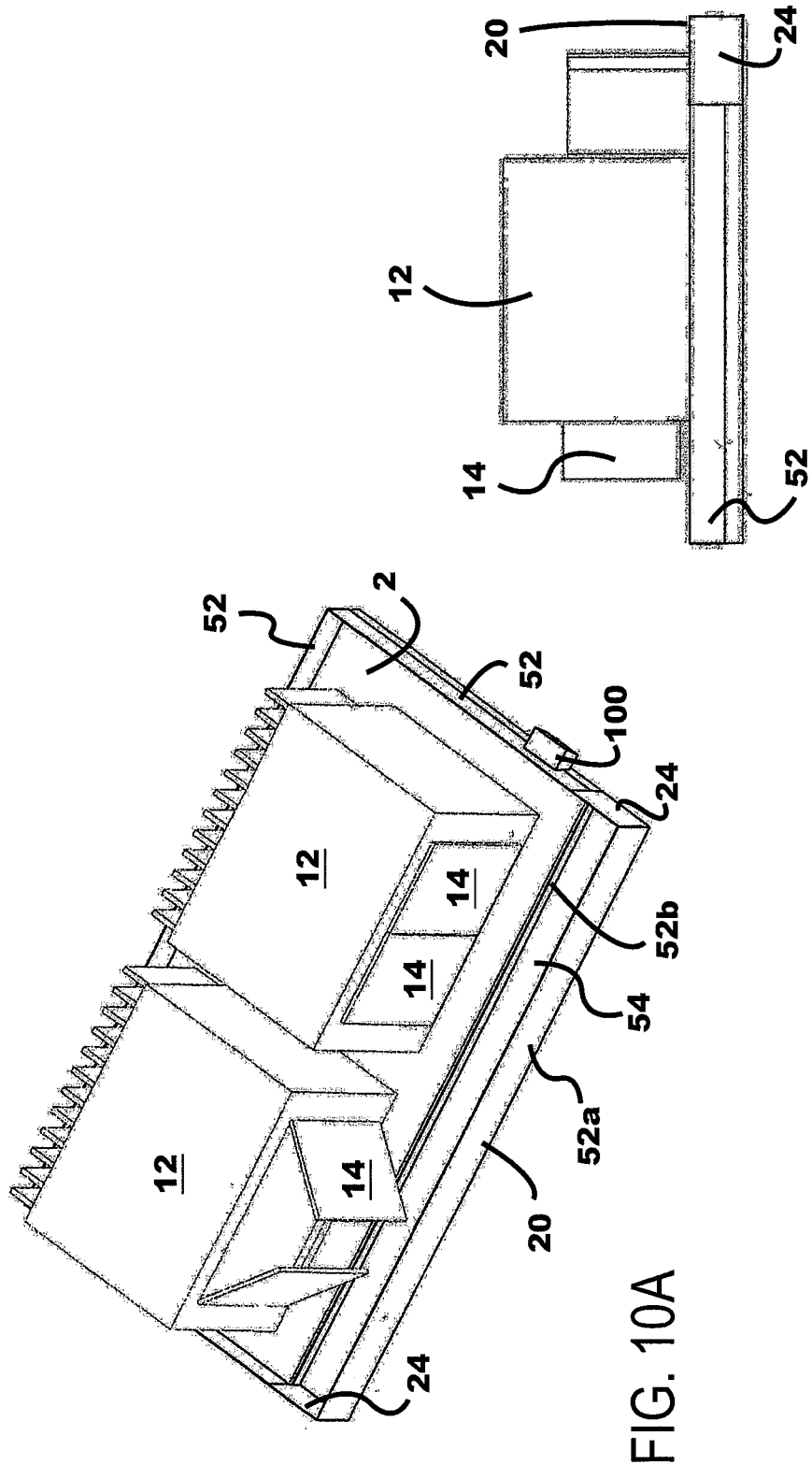

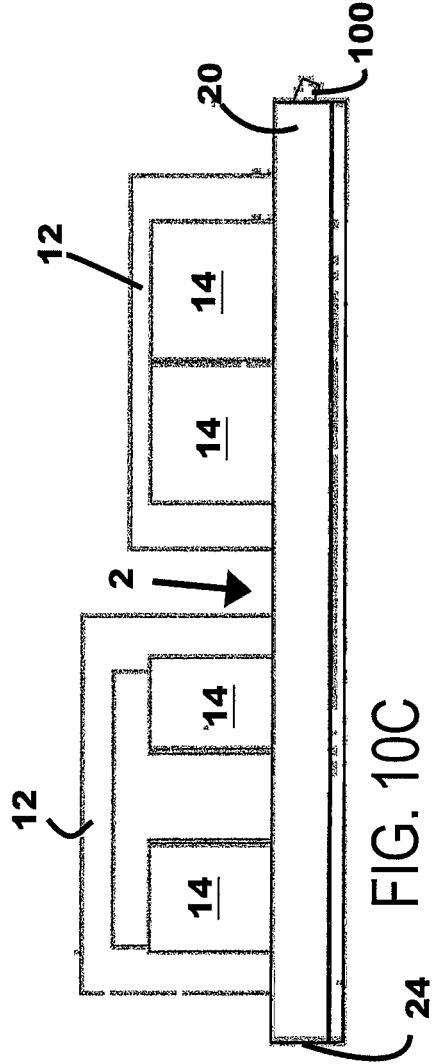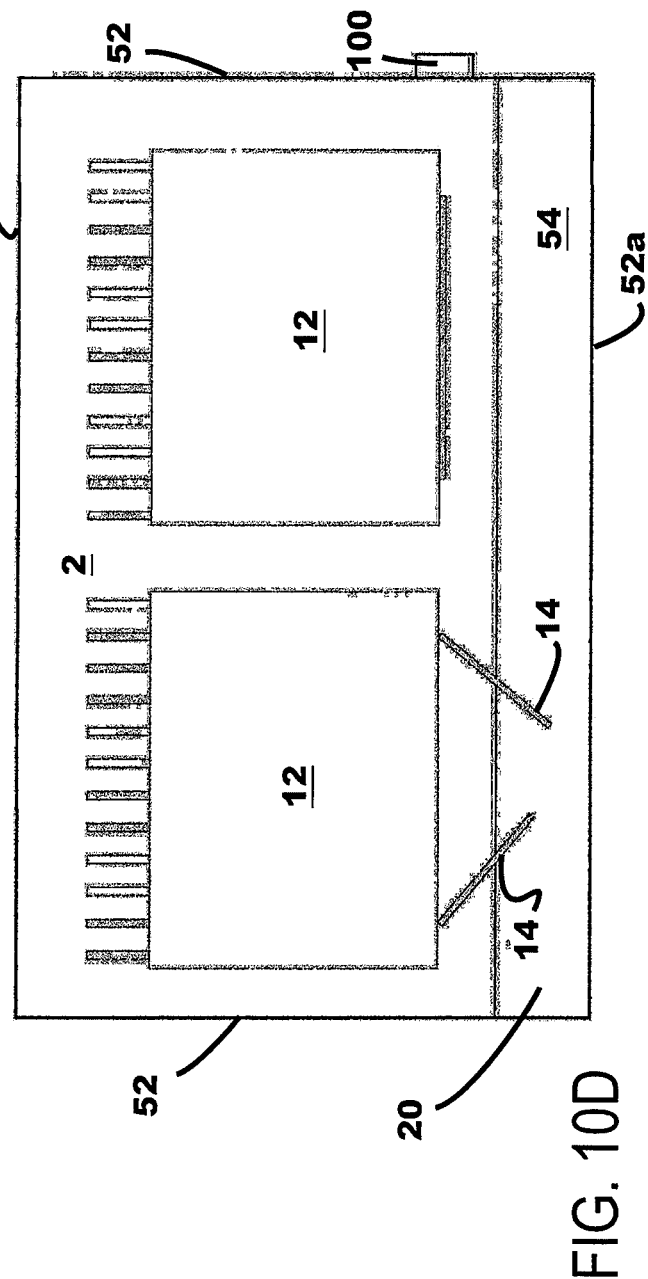

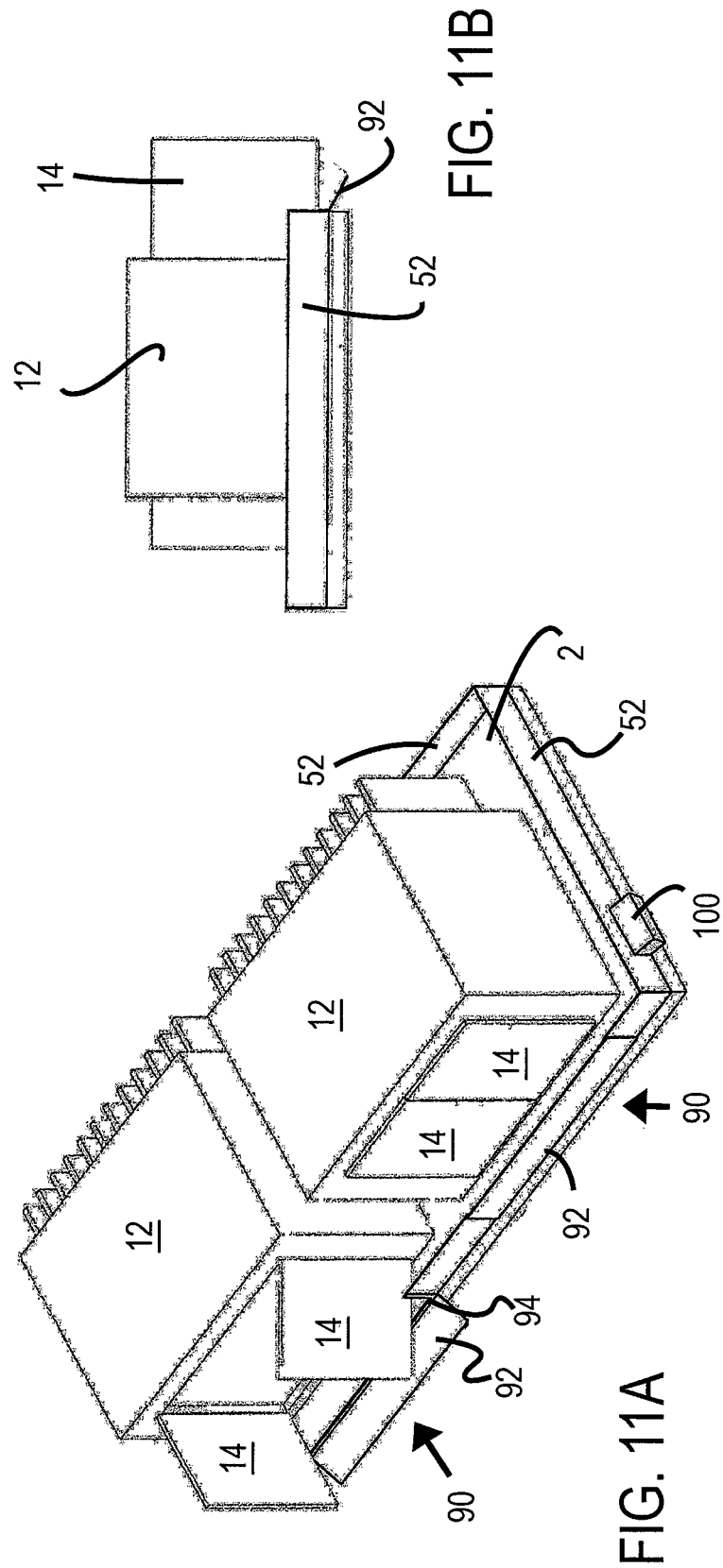

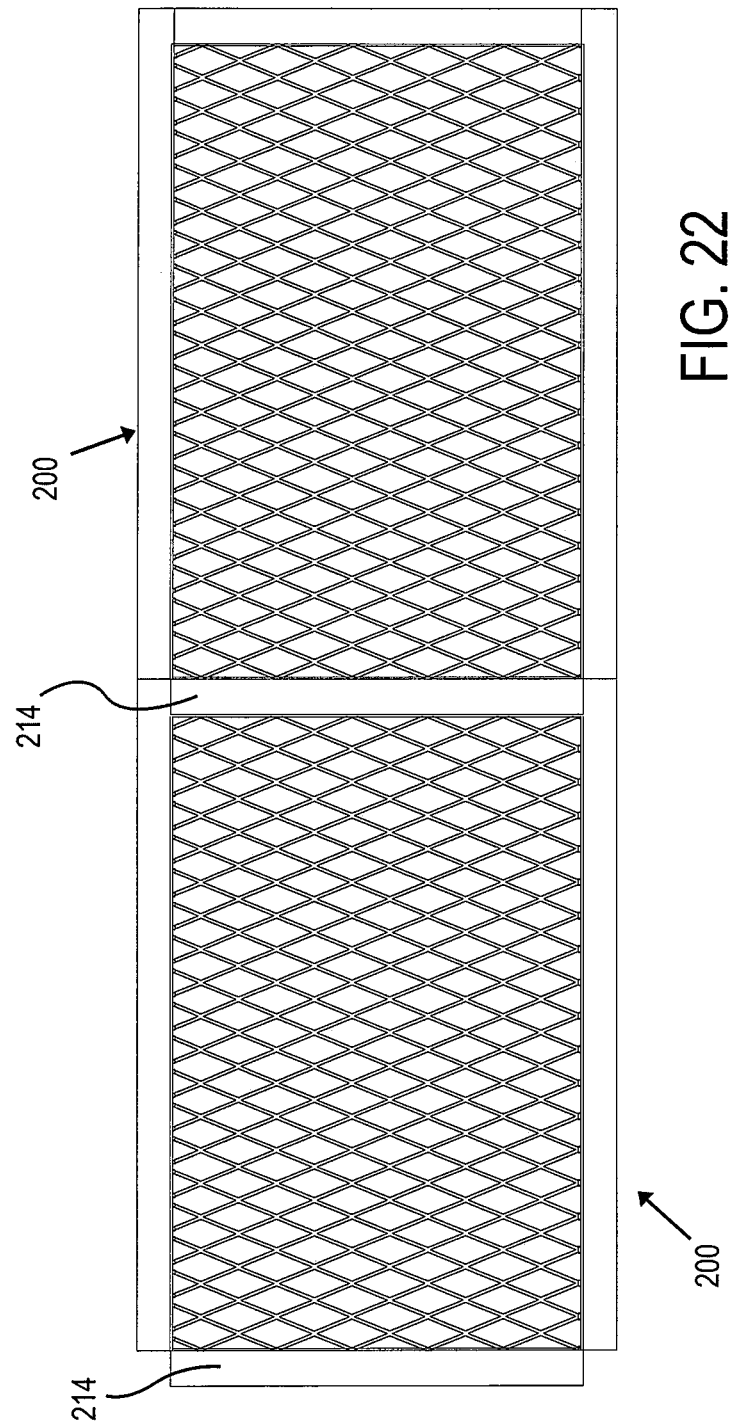

OIL CONTAINMENT SYSTEM AND METHOD

BACKGROUND OF THE INVENTION

1. Field of the Invention

The present invention relates to structures for the containment of natural ester-based fluids, including transformer mineral oil, from transformers, oil tanks, and other oil-filled equipment.

2. Description of Related Art

The majority of electric service transformers contains materials such as transformer mineral oil and/or other natural ester-based fluid which can be harmful to the environment. Depending on its size, a single transformer may carry quantities of these materials as little as 15 gallons, or in excess of 20,000 gallons. Due to the danger of contaminating the environment, countries around the world are enacting legislation and regulation to prevent such an occurrence. In the United States, the Environmental Protection Agency ("EPA") enacted regulation known as the Spill Prevention, Control, and Countermeasure ("SPCC"), requiring oil filled equipment to have a spill prevention plan in place requiring property owners to have oil containment on all oil tanks, transformers, etc., if a property has more than 1,320 total gallons of oil above ground or 42,000 gallons of underground storage.

SPCC Regulations require companies to have oil containment if their facility is within a reasonable distance of and could lead to a navigable waterway which includes rivers, streams, lakes, ponds, wetlands, marshes, oceans, bays, culverts, or storm drains, and the like. This makes utilities subject to oil containment for many of their transformer substations. There are many ways to install oil containment, including using concrete moats, earthen berms, walls, oil water separators, oil detection pumps, passive filtration, and liners. One of the largest problems existing to date is incorporating an effective and economic oil containment solution for existing transformers.

There are thousands of unprotected small to mid-sized transformers called pad mounts which range in size from 100 to 1,500 gallons. Many property owners have multiple pad mount units on their sites. Under SPCC regulations these transformers require oil containment. The problem is many of these pad mounted transformers have been in service for more than 50 years, long before any regulation existed. Many of the concrete pads house multiple transformers and are situated near property line fences, roadways, parking lots, buildings, trees, and landscaping. While the volume of oil varies from site to site, these pad transformers are not exempt from oil containment regulation.

Often these sites do not allow for easy construction of oil containment systems, since no containment was initially required or contemplated at the time of the original installation. Due to site constraints, significant demolition may be required before a property owner may begin to integrate oil containment systems, including removal of trees, concrete walkways, pavement, etc. After this demolition, the owner must ensure the containment system around the existing pad may hold the full oil volume of each transformer on the pad plus an approximate minimum of 10% freeboard for rain water. If a fabric liner is used for oil containment, it will also require the same foot print or larger due to backfilling with crushed stone. If the containment is below grade or underground, rainwater drainage presents another problem. While there are devices to filter rainwater out and seal in the event of an oil spill, these regulations require an oil containment to be utilized as well.

Due to these installation concerns, oil containment systems are time-consuming, costly, unsightly during the construction phase, and inefficient. Thus, a need exists in the prior art to devise an oil containment system which takes into consideration the property owner's concerns as well as the design considerations required for the existing pad.

SUMMARY OF THE INVENTION

Bearing in mind the problems and deficiencies of the prior art, it is therefore an object of the present invention to provide an oil containment system which may be retrofit to an existing transformer pad.

It is another object of the present invention to provide an improved and easier process of installing oil containment around a pad mounted transformer.

A further object of the invention is to provide an oil containment system which may be mounted directly on the transformer pad and may accommodate different configurations to provide total oil containment without having to disturb the outside environment.

It is yet another object of the present invention to provide an oil containment system which allows for site work on the transformer to be continued easily after installation of the oil containment system.

Still other objects and advantages of the invention will in part be obvious and will in part be apparent from the specification.

The above and other objects, which will be apparent to those skilled in the art, are achieved in the present invention which is directed to an oil containment system for a transformer mounted on a transformer pad, comprising a plurality of interlocking open-topped containment units, each of said plurality of containment units comprising: a base section, a sump formed with two vertically-aligned sidewalls, a first end, and a second end; said sidewalls having support struts extending across said sump; a grate member spanning said sump and supported on said support struts; at least one of said first end and said second end including an interlocking member comprising a connecting member or a receiving member, said connecting member sized to be placed within said receiving member sized such that said plurality of containment units are interlocked; and a discriminative outlet disposed within an opening in said sidewall of at least one of said plurality of containment units, said discriminative outlet including a filtration media for adsorbing oil from a fluid and subsequently blocking flow of oil through said discriminative outlet; wherein said plurality of interlocking open-topped containment units are secured to said transformer pad around a peripheral edge to restrict the migration of oil to an outside portion of said oil containment system. One of said sidewalls may include a flange extension on a top edge of said sidewall extending in a direction opposite said sump, such that said flange extension is securable to said peripheral edge of said transformer pad. Optionally, a first of said sidewalls may have a height greater than a second of said sidewalls to contain a volume of oil greater than said sump when said oil containment system is secured to said transformer pad. The discriminative outlet may comprise a wall box having a wall box casing extending from a grated base, an internal cavity, and a filtration media within said wall box for adsorption/absorption of oil. The wall box may further include a box flange surrounding an upper edge of said wall box casing at an end of said wall box opposite said grated base, said box flange extending outwardly from said wall box internal cavity in a direction perpendicular to said wall box casing, and wherein said opening in said sidewall includes a slotted groove for receiving the box flange and said opening includes a cantilevered platform to support said wall box. The discriminative outlet may comprise a holding sleeve including a filtration media for adsorption/absorption of oil. The sump may further include containment insert system comprising a plurality of barrier trays including an oil adsorbent filtration media. A removably securable shroud may be secured to a top edge of said sidewalls via a shroud connecting channel to encapsulate said plurality of interlocking, open-topped containment units, said shroud comprising a ceiling, two slanted shroud sidewalls extending from said ceiling, said connecting channel opposite said ceiling, and an opening along one of said slanted shroud sidewalls to permit the ingress of fluid into said containment unit sump. The containment units may be secured to said transformer pad around the peripheral edge such that said base section is at grade, below grade, or above grade and supported by a platform support secured to an underside of said base section.

The present invention also provides for a method of installing an oil containment system for a pad-mounted transformer, comprising: providing a plurality of interlocking, open-topped containment units, each of said plurality of containment units comprising: a base section, a sump formed with two vertically-aligned sidewalls, a first end, and a second end; said sidewalls having support struts extending across said sump; a grate member spanning said sump and supported on said support struts; at least one of said first end and said second end including an interlocking member comprising a connecting member or a receiving member, said connecting member sized to be placed within said receiving member sized for interlocking said plurality of containment units; providing a discriminative outlet disposed within an opening of said sidewall of at least one of said plurality of containment units, said discriminative outlet including a filtration media for adsorbing and/or absorbing oil from a fluid; connecting the at least one of said first end and said second end of a first of said plurality of containment units to the at least one of said first end and said second end of a second of said plurality of containment units via said connecting member and said receiving member such that said first and second plurality of containment units are adjacent each other and form a fluid tight seal; securing said plurality of containment units to said transformer pad around a peripheral edge; wherein said oil containment system may restrict migration of oil to an outside portion of said oil containment system and wherein said oil containment system may provide migration of water to said outside portion. The containment units may be secured to said transformer pad around the peripheral edge such that said base section is at grade, or above grade and supported by a platform support secured to an underside of said base section. The method may further comprise providing a shroud removably securable to a top edge of said sidewalls via a shroud connecting channel to encapsulate said plurality of interlocking, open-topped containment units, said shroud comprising a ceiling, two slanted shroud sidewalls extending from said ceiling, said connecting channel opposite said ceiling, and an opening along one of said slanted shroud sidewalls to permit the ingress of fluid into said containment unit sump; placing said shroud connecting channel to said top edge of said sidewalls such that said shroud is removably secured to said plurality of said plurality of interlocking, open-topped containment units and wherein said shroud encapsulates said plurality of interlocking, open-topped containment units.

The present invention further provides for an oil containment insert system comprising: a frame member including vertical sidewalls with top edges extending along a length and a width of said frame member; a grated base secured to said frame member approximately perpendicular to said vertical sidewalls, said vertical sidewalls and base plate forming an internal cavity; sealing flanges extending outwardly from said top edges and away from said cavity along said length; a connecting flange extending outwardly from said top edges and away from said cavity along said width; an inset flange extending outwardly from said top edges and away from said cavity along said width; said internal cavity including a grated compression layer secured thereto said internal cavity further including an adsorbent fabric layer adjacent said grated base, a poly floss layer adjacent said compression, and an oil adsorbent filtration media layer therebetween; wherein said oil containment insert system provides for migration of water between said grated compression layer and said grated base and restricts migration of oil between said grated compression layer and said grated base. The sealing flanges may contain a gasket on an underside thereof to facilitate a fluid-tight seal upon placement of said insert system within a sump or trench. The insert system may further include a prefilter layer adjacent the grated compression layer. The connecting flange may be placed onto the inset flange of an adjacent oil containment insert system to create a fluid-tight seal therebetween.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 10A is a perspective view of an embodiment of the oil containment system of the present invention along a single edge of the transformer pad;

FIG. 10B is a side elevational view of an embodiment of the oil containment system of FIG. 10A;

FIG. 10C is a front elevational view of an embodiment of the oil containment system of FIG. 10A;

FIG. 10D is a top plan view of an embodiment of the oil containment system of FIG. 10A;

FIG. 11A is a perspective view of an embodiment of the oil containment system of the present invention depicting a hinged closure system having a gate section, and gasket seal;

FIG. 11B is a side elevational view of an embodiment of the oil containment system of FIG. 11A;

FIG. 22 is a top plan view of the two adjacent oil containment insert systems of FIG. 20 after interconnection;

DESCRIPTION OF THE EMBODIMENT(S)

In describing the embodiment of the present invention, reference will be made herein to FIGS. 1-25 of the drawings in which like numerals refer to like features of the invention.

Figure 1:
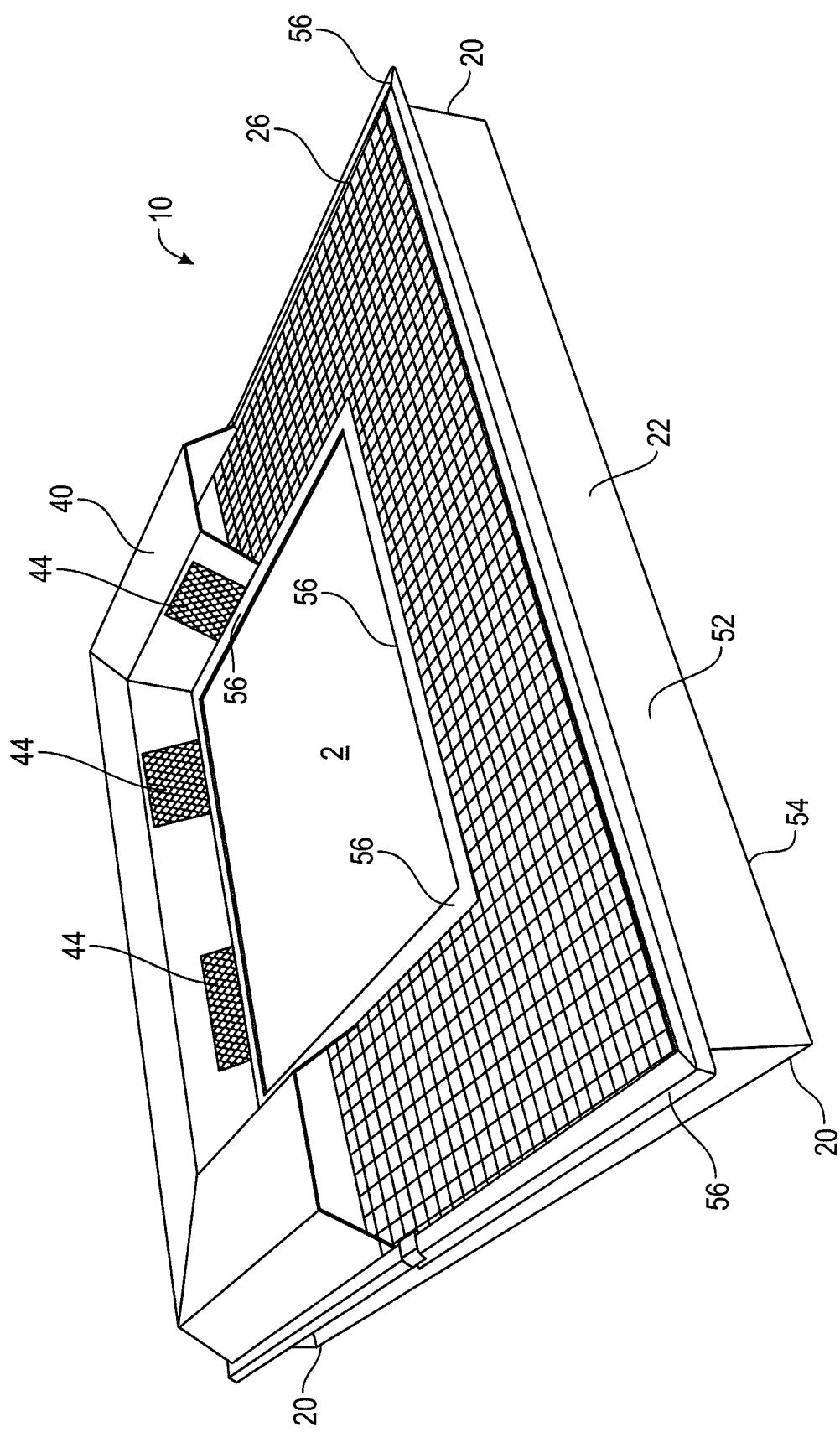
FIG. 1 is a perspective view of an embodiment of the oil containment system of the present invention.
Figure 2:
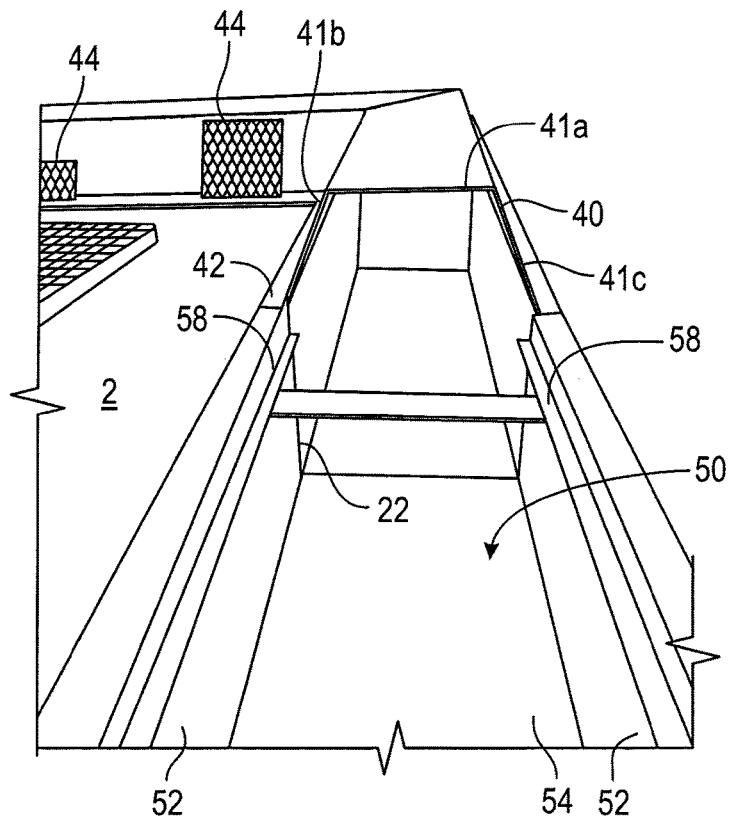
FIG. 2 is an enlarged, partial perspective view of the embodiment of FIG. 1.
Figure 3:
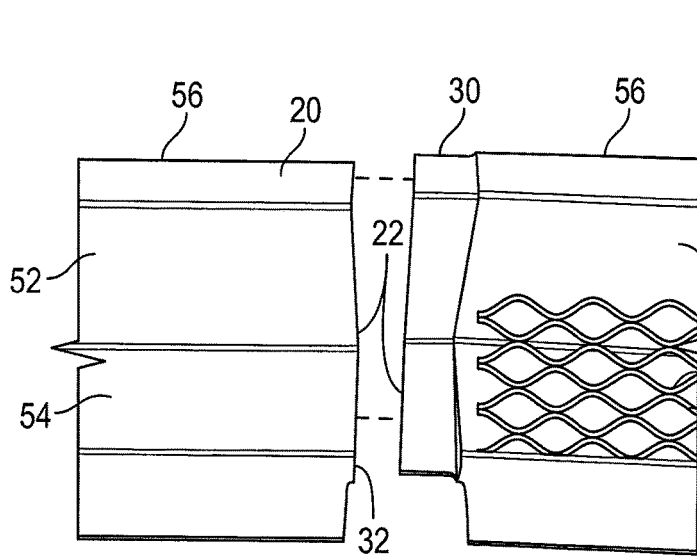
FIG. 3 is an enlarged, partial perspective view of the interconnecting containment units of the present invention.
Figure 4:
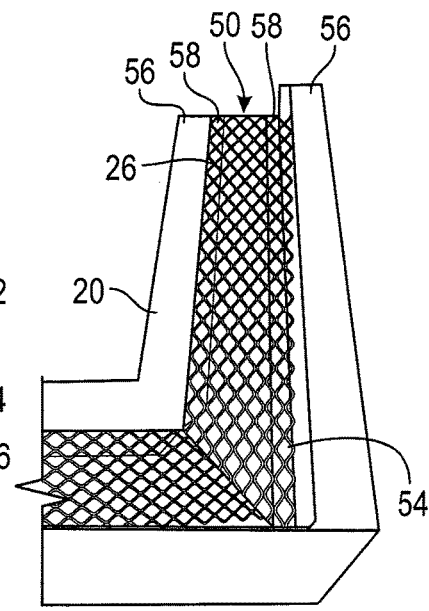
FIG. 4 is a partial perspective view of an embodiment of the containment unit of the present invention.
Figure 5:
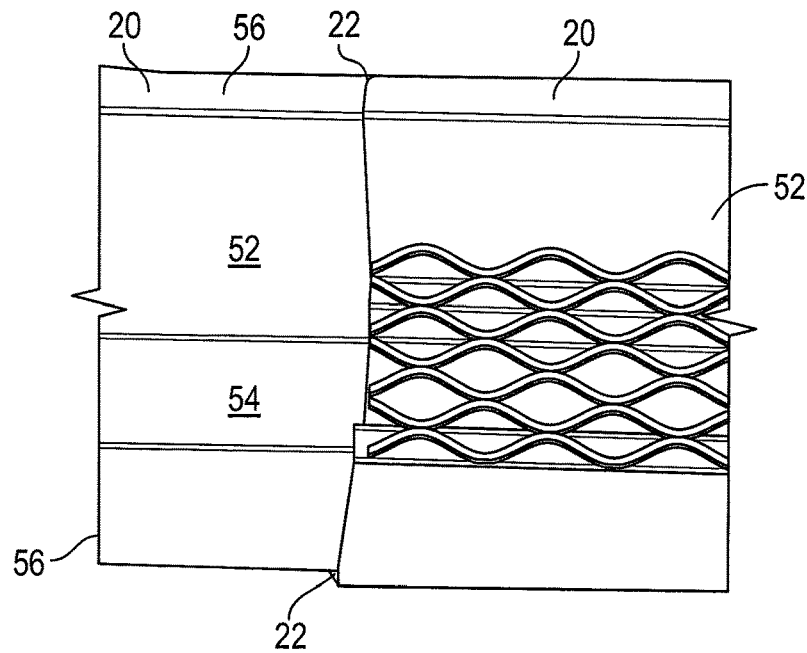
FIG. 5 is an enlarged, partial perspective view of the interconnecting containment units of the FIG. 3, after connection.
Figure 6:
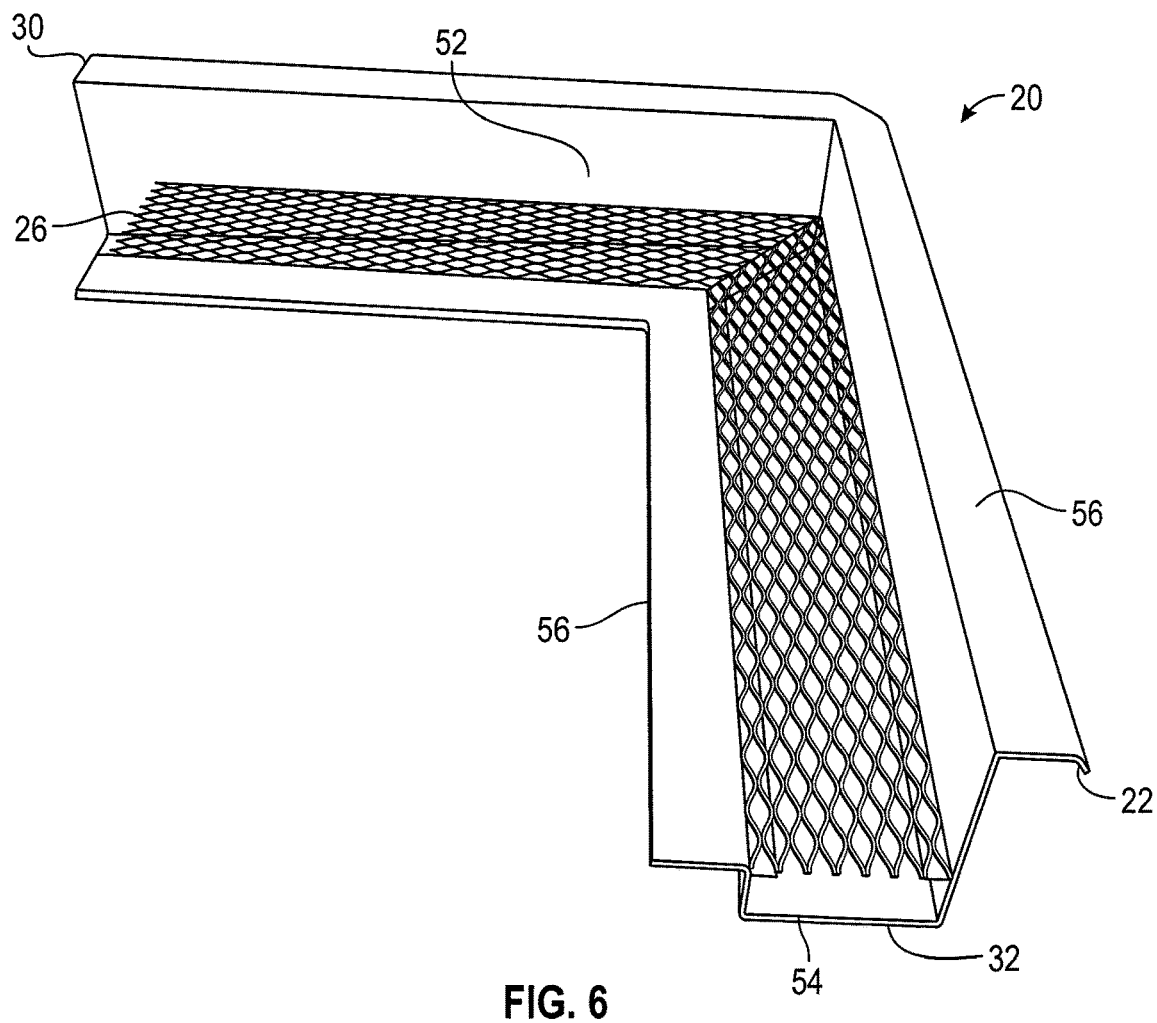
FIG. 6 is a partial perspective view of a containment unit of the present invention.
Figure 8:
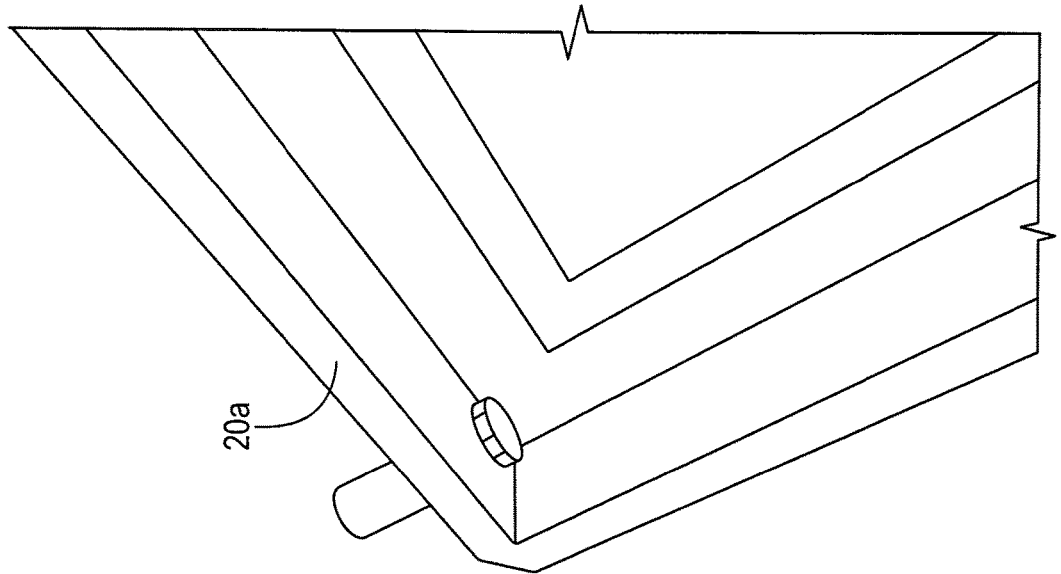
FIG. 8 is a perspective view of an embodiment of the oil containment system of the present invention mounted on a pad.
Figure 7:
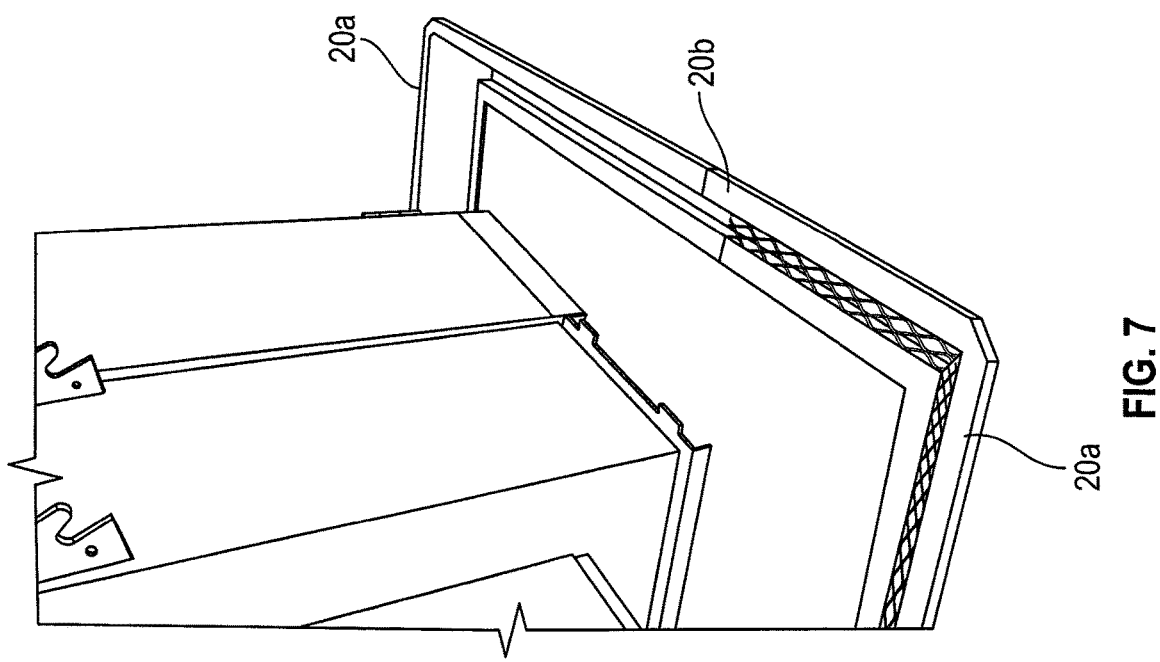
FIG. 7 is a perspective view of a side portion of an embodiment of the oil containment system of the present invention.
Figure 9:
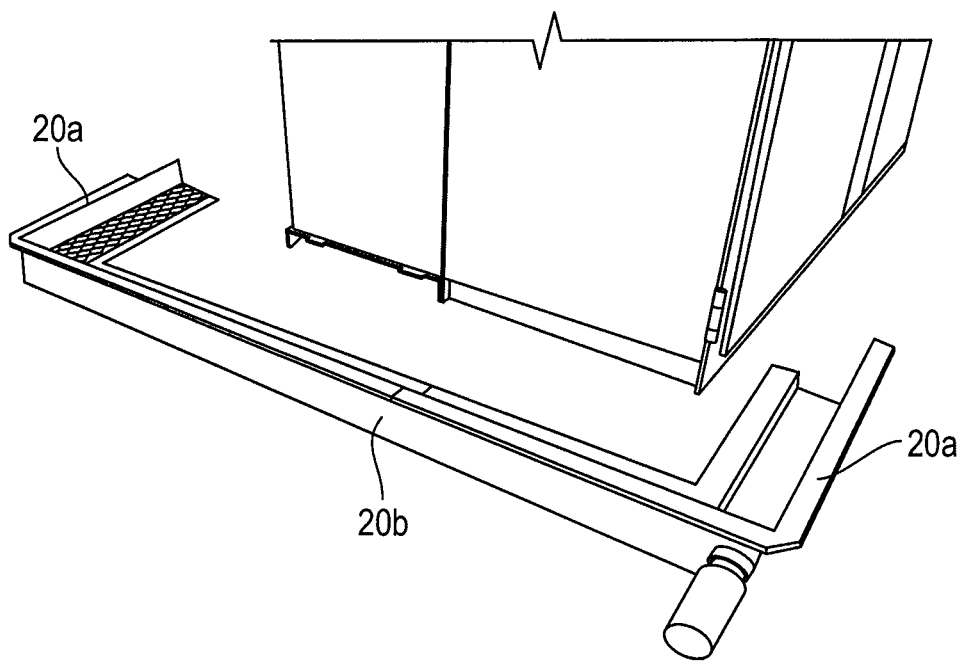
FIG. 9 is a perspective view of an embodiment of the oil containment system of FIG. 7, during installation.

As depicted in FIGS. 1 and 2, the oil containment system 10 comprise a series of interlocking containment units 20 which surround a transformer pad 2. While the embodiments of the present invention depicted are incorporated within a pad-mounted transformer, other uses for the oil containment system are not meant to be precluded. The present invention may be utilized within any structure for which containment of transformer mineral oil and other natural ester-based fluids is needed, such as substations, refueling areas, or any other location which include oil tanks and/or other oil-filled equipment. Similarly, while the present invention may be incorporated within a concrete pad, a person of skill in the art would recognize that the present invention should not be so limited. The oil containment systems and methods of installation of the present invention may be utilized on pads of any material, including, for example, rubber pads or synthetic pads.

Each containment unit 20 includes an open top and sump portion 50 formed by two vertically-aligned side walls 52, and a base section 54, sealed to contain fluid. Support struts 58 extend from sidewalls 52 across sump 50, creating a shelf to support a grate member 26 thereon. Grate member 26, in addition to preventing dirt and debris from collecting within the oil containment system 10, provides necessary strength and support to the containment unit 20 to allow access for a person to walk above the sump 50. Grate member 26 may be a diamond grating, a pre-filter grate, mesh, or any other form of grating which could be used by a person of ordinary skill in the art. A horizontal flange extension 56 extends from an upper edge of the sidewalls 52 in a direction opposite sump portion 50, and may be curled at the ends to further support the structure of the containment unit 20. Each end 22 of the containment unit 20 includes an interlocking member which may be a connecting member 30 (FIG. 3) or a receiving member 32 (FIG. 6) to interlock adjacent containment units 20 and provide a fluid-tight connection. Connecting member 30 may be a stepped protrusion extending from end 22 along the periphery of the sidewall(s) 52 portions, base 54, or both. Connecting member 30 is sized to complement and connect with the receiving member 32, which may be a groove or slot on containment unit end 22 which accepts the connecting member 30 of an adjacent containment unit 20. Connecting member 30, receiving member 32, or end 22 may include a gasket, or a rubber coating to ensure a fluid-tight seal is established along the seams of two adjacent containment units 20 after interconnection is established. Containment units 20 may be constructed of aluminum, stainless steel, galvanized steel, polycarbonate, fiberglass, PVC, HDPE, carbon fiber, plastic, or any other suitable material. The containment units may be constructed using injection molding applications, welding, or any other form of fabrication process used by a person of ordinary skill in the art. While the embodiments shown depict a containment unit which incorporates both ends having an interlocking member, it should be understood that the instant invention is not meant to be so precluded. Similarly, in cases where both ends of the containment units include an interlocking member, any combination of connecting or receiving members may be utilized.

Turning now to FIGS. 10A to 10D, oil containment system 10 is depicted comprising interlocked containment units 20 surrounding the transformer pad 2. As shown, the containment units are placed around the peripheral or perimeter edge of the transformer pad 2, creating an interior sidewall 52b and an exterior sidewall 52a. The interior sidewall 52b is placed adjacent the transformer pad edge, extending to the top surface of the pad 2 such that the horizontal flange extension 56b extends over a portion of the pad surface. After placement on the pad, interior flange extension 56b may be anchored onto the pad with concrete screws, bolts, rivets, nails, or any other suitable fastener. A bead of construction adhesive (or any other suitable adhesive for fluid-tight applications) may similarly be placed on the leading edge of flange extension 56b to both provide a fluid-tight and secure connection to the pad surface 2. The interlocking containment units of the present invention are of a size and shape necessary to properly surround the transformer pad 2 and contain an appropriate amount of fluid in relation to the transformer 1. Specifically, the sidewalls 52, as well as the base 54 of any of the containment units 20 may be altered to facilitate the required volume of fluid which may be stored in relation to the transformer within the pad 2 (for example, 110% of the fluid capacity of the transformer pad). The oil containment system may be formed such that the base 54 sits at the ground level, having sidewalls which may extend to be level with the top surface of the transformer pad 2 on all sides, or even allow for the exterior sidewall 52a to extend beyond the pad surface. The salient features of the instant invention provide for an oil containment system which may be specified based on the location of the transformer, transformer pad, and surrounding environment.

Optionally, the oil containment system may contain a removably securable shroud 40, to encapsulate the containment units 20 to prevent wearing within the sump 50. As shown in FIGS. 1 and 2, shroud 40 is formed from a shroud ceiling 41a and slanted sidewalls 41b, 41c, which may be constructed of aluminum, stainless steel, galvanized steel, polycarbonate, fiberglass, PVC, HDPE, carbon fiber, plastic, or any other suitable material. A connecting channel 42 is opposite the shroud ceiling 41a and is interlocking with the containment unit sidewalls 52, or flange extensions 56 to removably secure the shroud to the oil containment system 10. The shroud 40 is solid in construction and therefore prevents any material from entering the containment units, except for the grated openings 44 which are along sidewall 41b, facing the interior of the transformer pad 2 which would contain the transformer. The shroud system 40 is therefore advantageous, allowing only fluids originating from the pad surface into the oil containment system, thereby preventing excess rain, snow, and debris from entering the oil containment system 20. Thus, wear and oxidation are further prevented within the system 20, increasing the life expectancy of the containment system 20 before replacement.

The containment units 20 which comprise the oil containment systems of the present invention are interlocking units of different dimensions and shapes which form a containment barrier around a transformer pad 2. As shown in the exemplary oil containment system 10 of FIGS. 7 to 9, the transformer pad 2 is surrounded along its peripheral edge by the interlocking containment units 20a, 20b. As depicted, containment unit(s) 20b form a linear profile while the other units 20a form an angled profile. While the containment units 20a are depicted having an approximately 90-degree bend, these are for exemplary purposes only. A skilled artisan would understand the containment units may be formed having any shaped profile which would facilitate placement of the containment units around a transformer pad.

In some embodiments, like that of FIGS. 10A to 10D, the oil containment system 10 may comprise a containment unit 20 along a single edge of the transformer pad 2, terminating at the ends 22 with an endcap 24. Rather than using a containment unit 20 on the remaining sides of the transformer pad 2, the oil containment system may utilize sidewalls 52 secured to the pad edges with concrete screws, bolts, rivets, nails, or any other suitable fastener. A bead of construction adhesive (or any other suitable adhesive for fluid-tight applications) may similarly be utilized to both provide a fluid-tight and secure attachment to the pad surface 2. Like any of the previous embodiments, the sidewalls of the oil containment system 10 may be adjusted to any size which would allow for the necessary oil containment. The oil containment system may be installed at grade or ground level, may be elevated above grade, or may even be placed below grade. In some embodiments, the location of the pad will require the excavation of the site surrounding the pad to properly install the oil containment system of the present invention. Thus, the oil containment system may further be installed in locations which are below grade to ensure proper oil containment of mineral oil and other natural ester-based materials. In other embodiments, the oil containment system of the present invention may include any combination of grade installation. This is of particular advantage in areas of installation in which the pad was subject to erosion on at least one face of the pad. To prevent an electrical discharge, the metal panels comprising the oil containment system may include a coated or dipped into a coating solution, that when cured provides a rubberized coating over the metal. In addition, the metal panels may also be grounded via a copper rod driven into the ground electrically attached to the metal panels, and there may be any number of grounding connections which would provide sufficient electrical grounding based on the size of the transformer. The oil containment system 10 is designed so that it may be retrofit into any environment which a transformer and pad is located, and provides for an assembly and installation which is safe, efficient, and non-invasive to the pad's surrounding environment.

In some embodiments, like those shown in FIGS. 11A to 11D, the oil containment system 10 may include a hinged closure system 90 including a gate section 92, and gasket seal 94. The hinged closure system is desirable in areas where the transformer encased within a control cabinet 12, requiring opening of the cabinet doors 14 to perform service operations. As depicted, a hinged gate section 92 of the sidewall of the oil containment system 10 may be installed to allow the section of the sidewall to lower to ground level, providing the necessary clearance to the cabinet doors 14. After performing the necessary service operations and closing the cabinet doors 14, gate section 92 may be raised into position with the adjacent sidewalls of the oil containment system 10 and secured in place using a closure mechanism. The closure mechanism may be a magnetic latching mechanism, a cam latch, compression latch, sliding latch, a threaded fastening mechanism, or any other closure method which would be understood by a person of ordinary skill in the art. Gasket seal 94 surrounds the gate section 92, ensuring a fluid-tight seal after the gate section 92 has been closed and secured. Optionally, the width of the drain channel 50 between sidewalls 52a, 52b may be sized to provide clearance of the cabinet doors 14 of the control cabinet (see e.g., FIGS. 10A to 10D).

Figure 12:
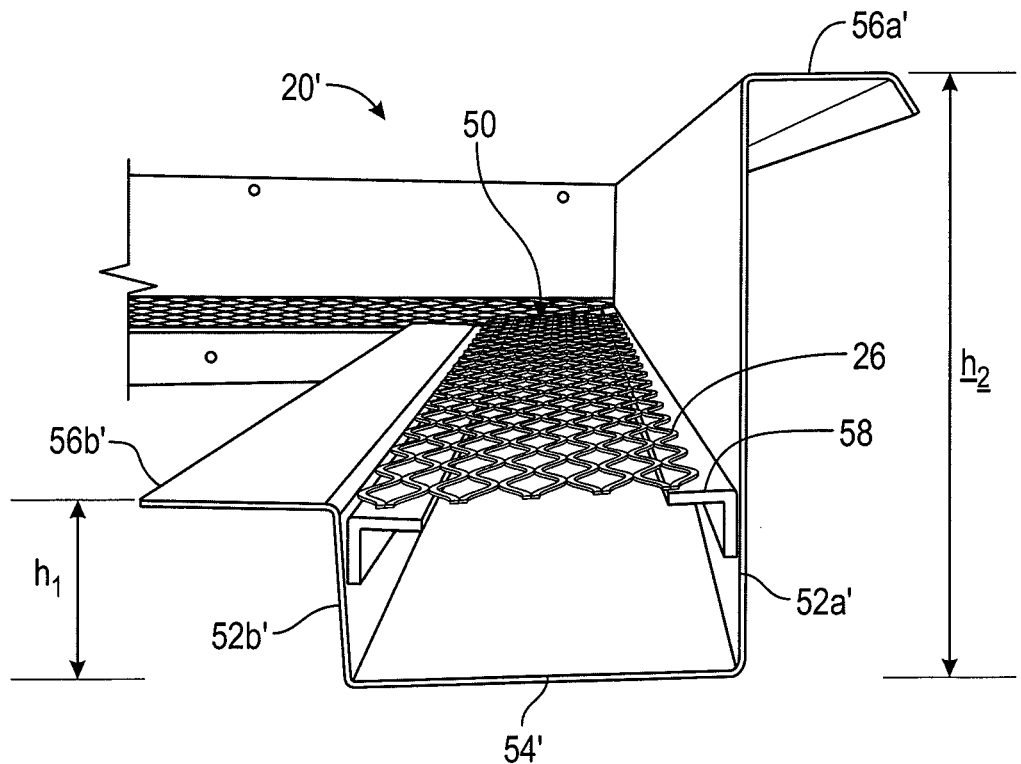
FIG. 12 is a side elevational view of an embodiment of the oil containment units of the present invention depicting the height $h_1$ of the inner side wall and the height $h_2$ of the outer side wall.
Figure 11C:
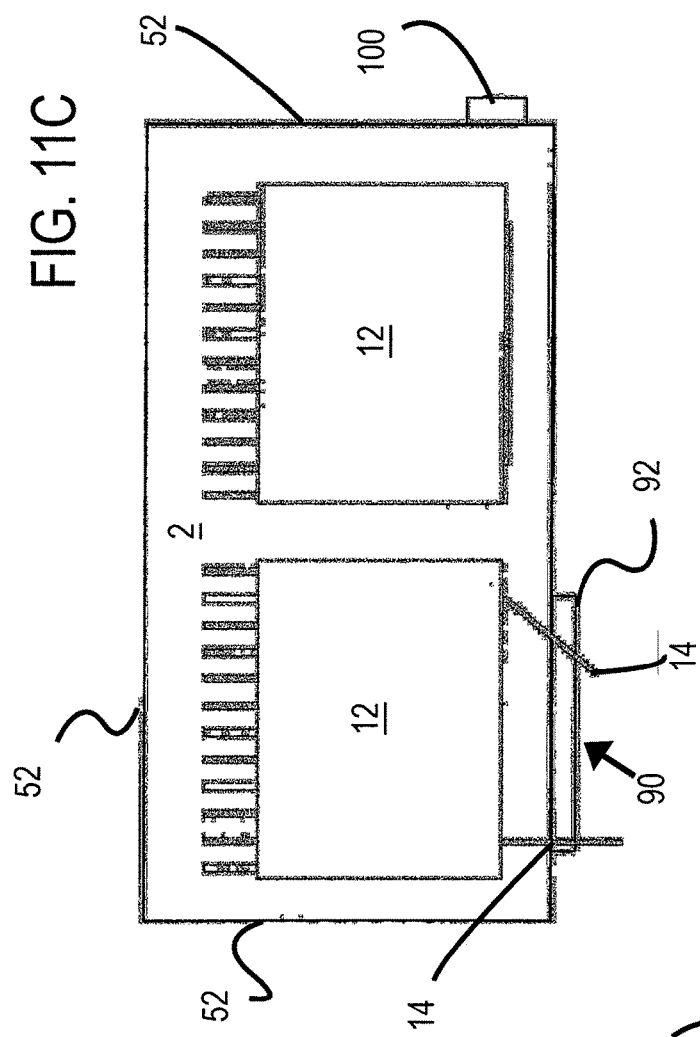
FIG. 11C is a front elevational view of an embodiment of the oil containment system of FIG. 11A.
Figure 11D:
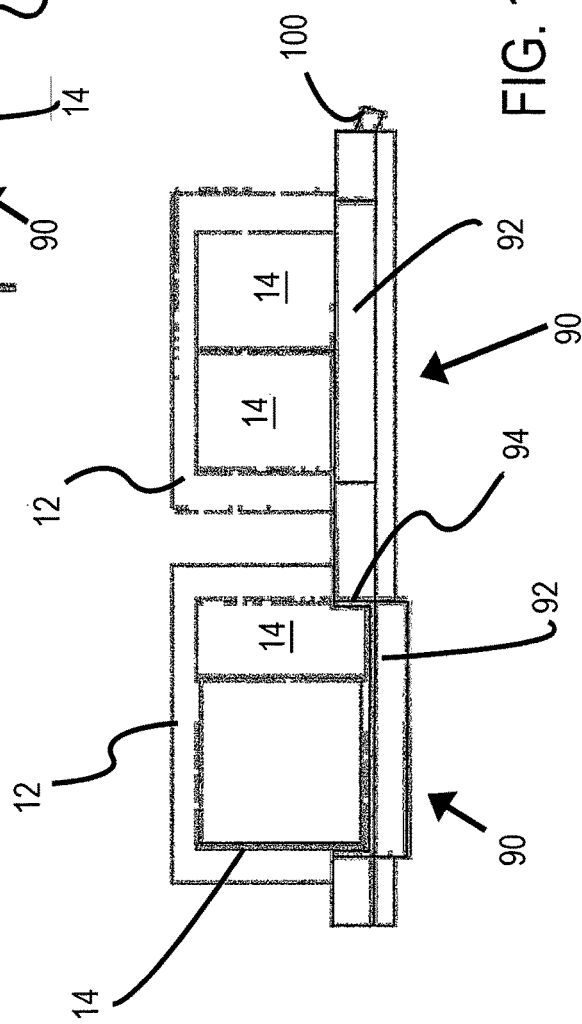
FIG. 11D is a top plan view of an embodiment of the oil containment system of FIG. 11A.
Figure 13:
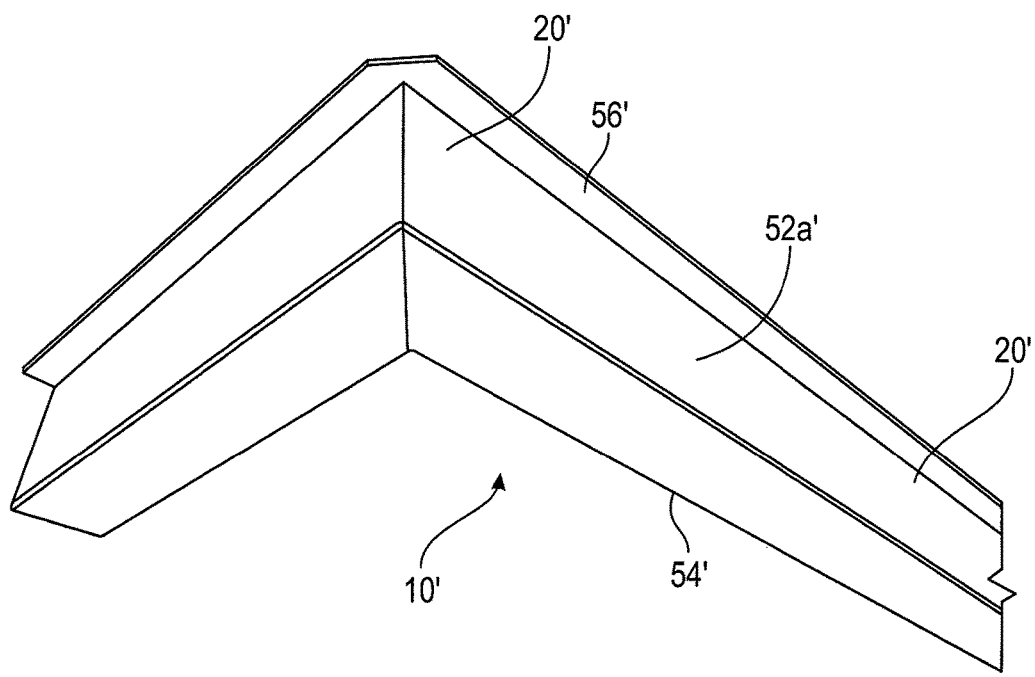
FIG. 13 is a bottom perspective view of the oil containment units of FIG. 12, forming an oil containment system.

In some embodiments, such as those depicted in FIGS. 12 and 13, the height $h_1$ of the inner side wall 52b' may differ from the height $h_2$ of the outer side wall 52a'. As shown, height $h_2$ of the outer side wall 52a' is greater than the height $h_1$ of the inner side wall 52b', forming a generally J-shaped cross-section to the containment units 20', though other configuration and cross-sectional shapes are not meant to be precluded. By having a varying sidewall height, containment units 20' may hold a volume of fluid greater than that of the sump 50'. Thus, the total containment volume differs from the volume created by the sump 50' formed by sidewalls 52' and base 54'. Advantageously, the oil containment volume of the embodiment includes the region from the pad 2 surface to the outer sidewalls 52a' and up to the top edge of sidewall 52'. Expressed as a mathematical function, the embodiment provides for an additional oil containment volume V equal the product of the difference in height of the sidewalls $(h_2-h_1)$ and the combination of the surface area of the pad $A_p$ plus the surface area of the containment unit base 54' surrounding the pad $A_b$. Thus, the function of the additional oil volume which may be contained can be expressed as:

$$V=(h_2-h_1)*(A_p+A_b)$$

To provide additional structure and rigidity to the system due to the difference in sidewall dimensions, flange extension 56a' of the outer wall 52a' may extend in a direction away from the transformer and pad, or may alternately extend towards the sump 50' in an effort to prevent the force of fluid within the system to deform the sidewalls 52'. Thus, the oil containment system units of the embodiment described are capable of holding a fluid volume significantly greater than the sump 50', and may be particularly advantageous in areas where the space surrounding the transformer pad is limited.

Figure 14A:
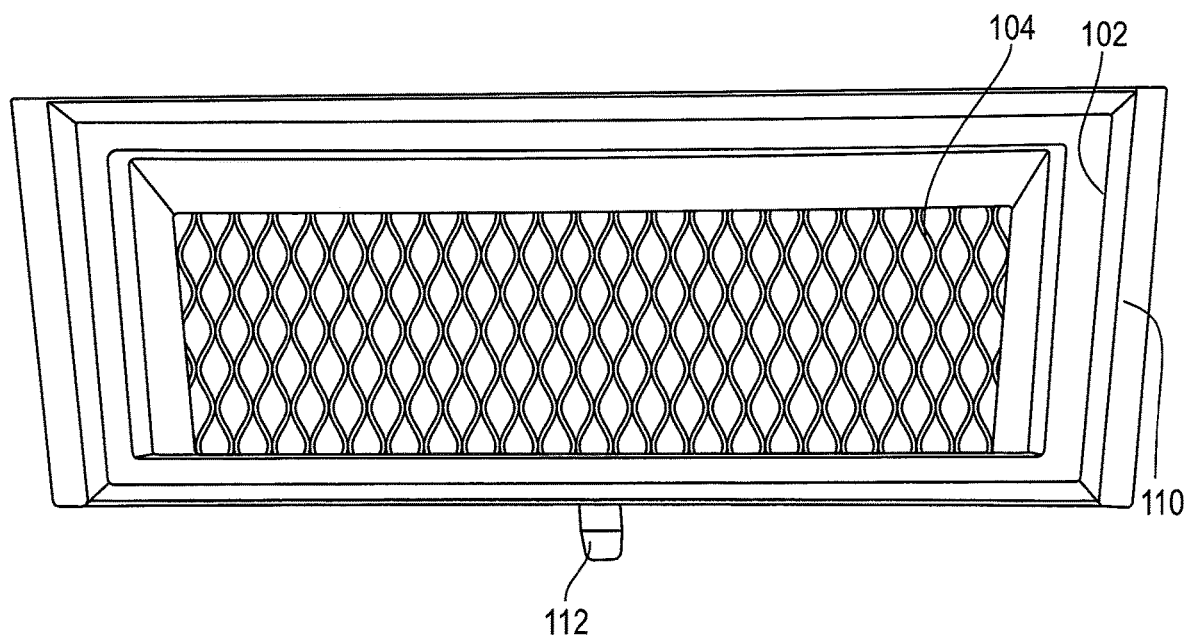
FIG. 14A is a front elevational view of an embodiment of the discriminative outlet of the present invention.
Figure 14B:
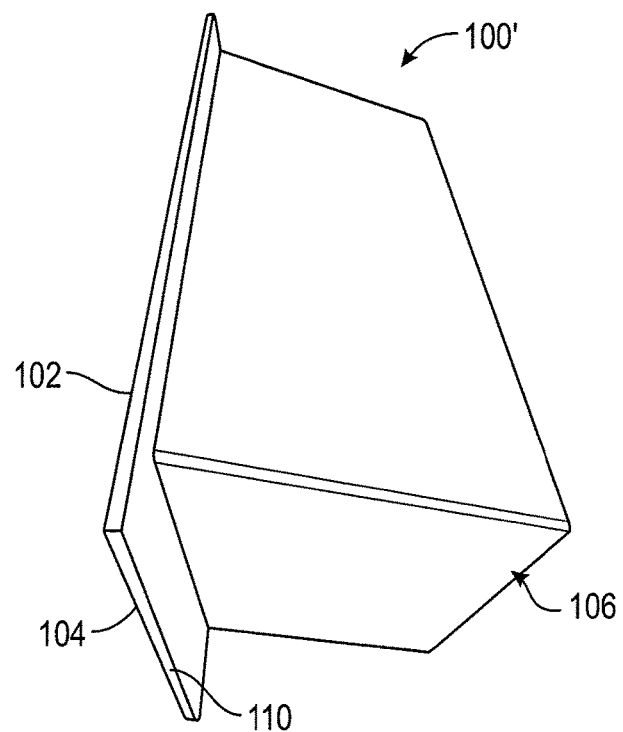
FIG. 14B is a side perspective view of an embodiment of the discriminative outlet of the present invention.
Figure 14C:
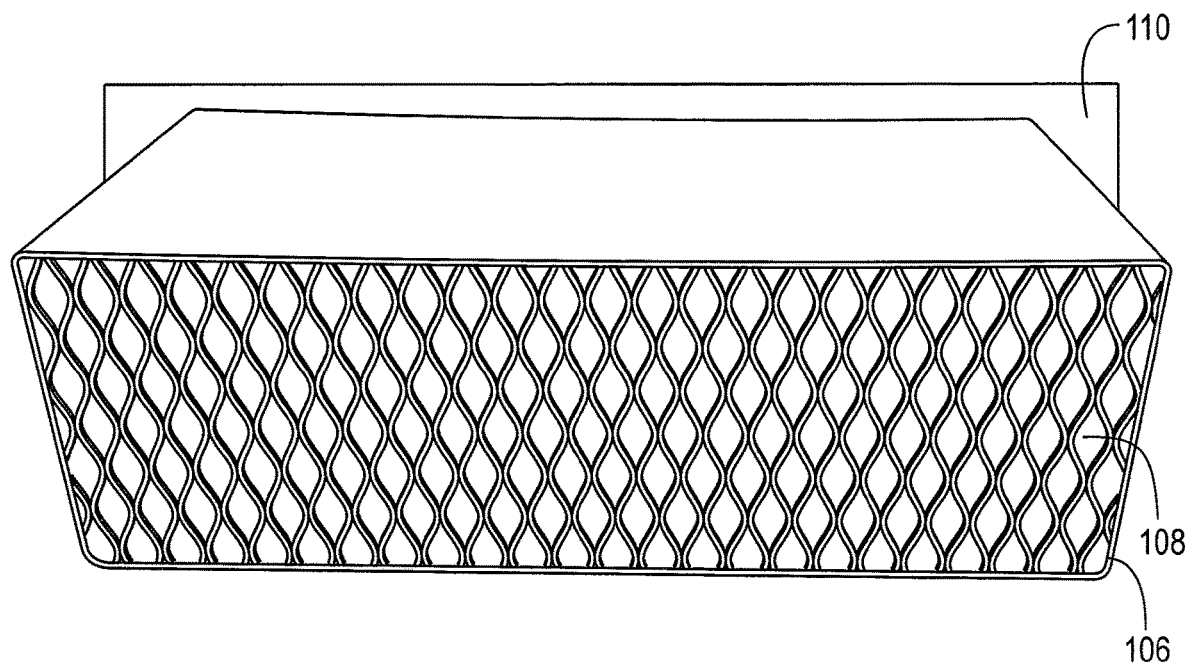
FIG. 14C is a back elevational view of an embodiment of the discriminative outlet of the present invention.
Figure 15:
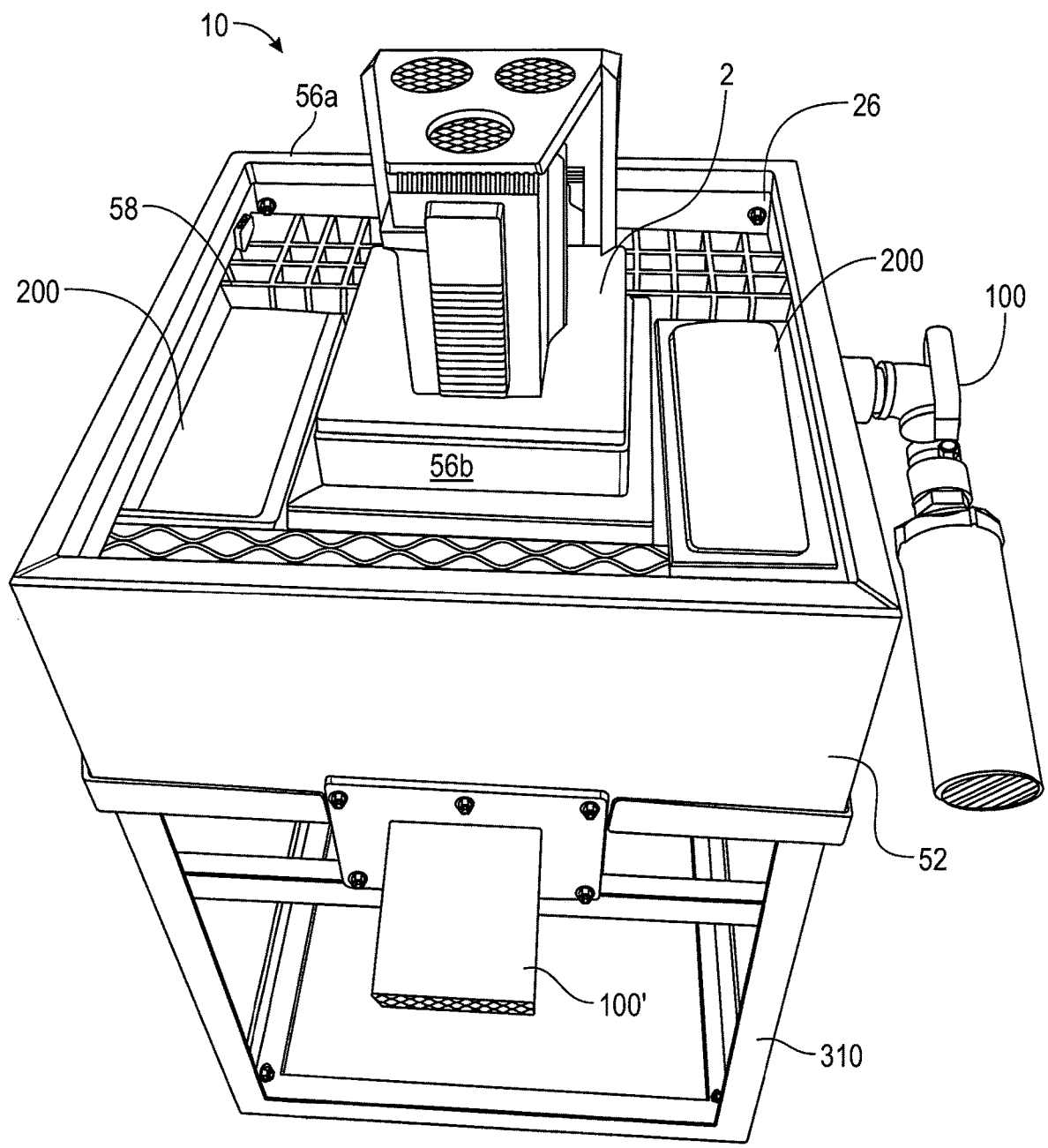
FIG. 15 is a perspective view of an embodiment of the oil containment system of the present invention.
Figure 16:
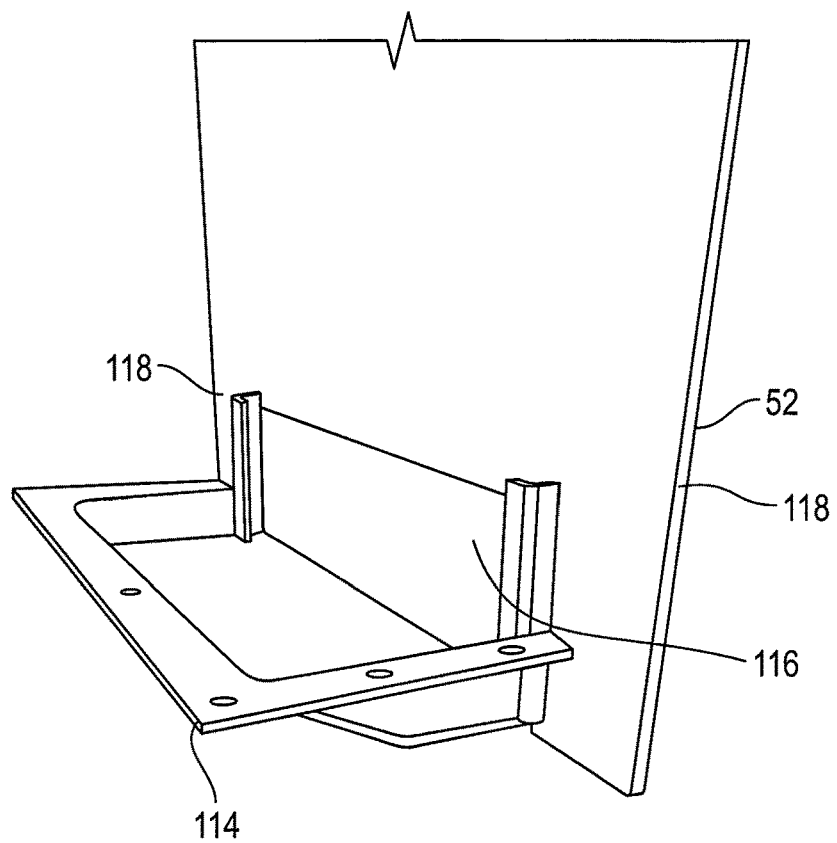
FIG. 16 is a perspective view of a portion of a containment unit sidewall of an embodiment of the containment system of the present invention.
Figure 23:
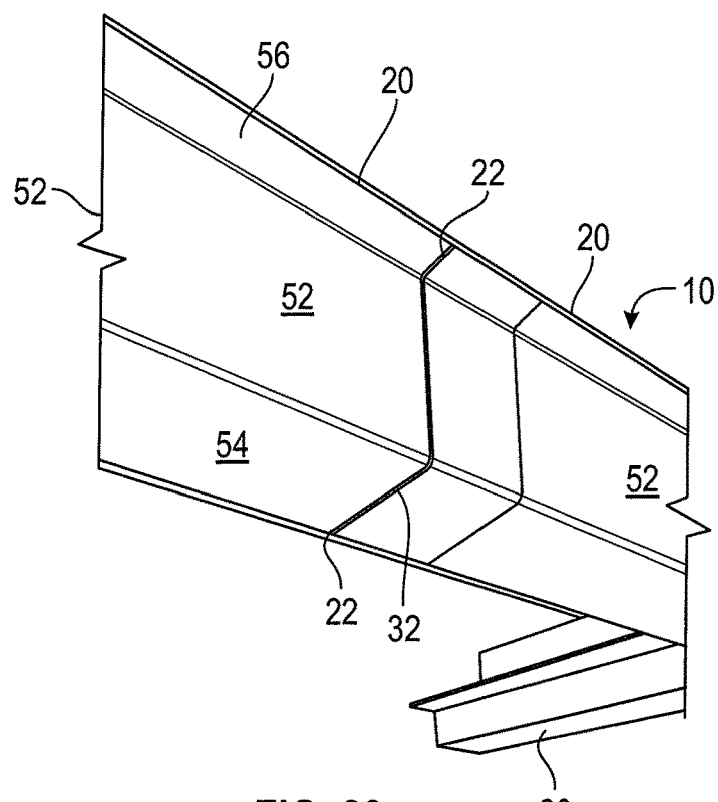
FIG. 23 is a bottom perspective view of the oil containment system of the present invention.
Figure 24:
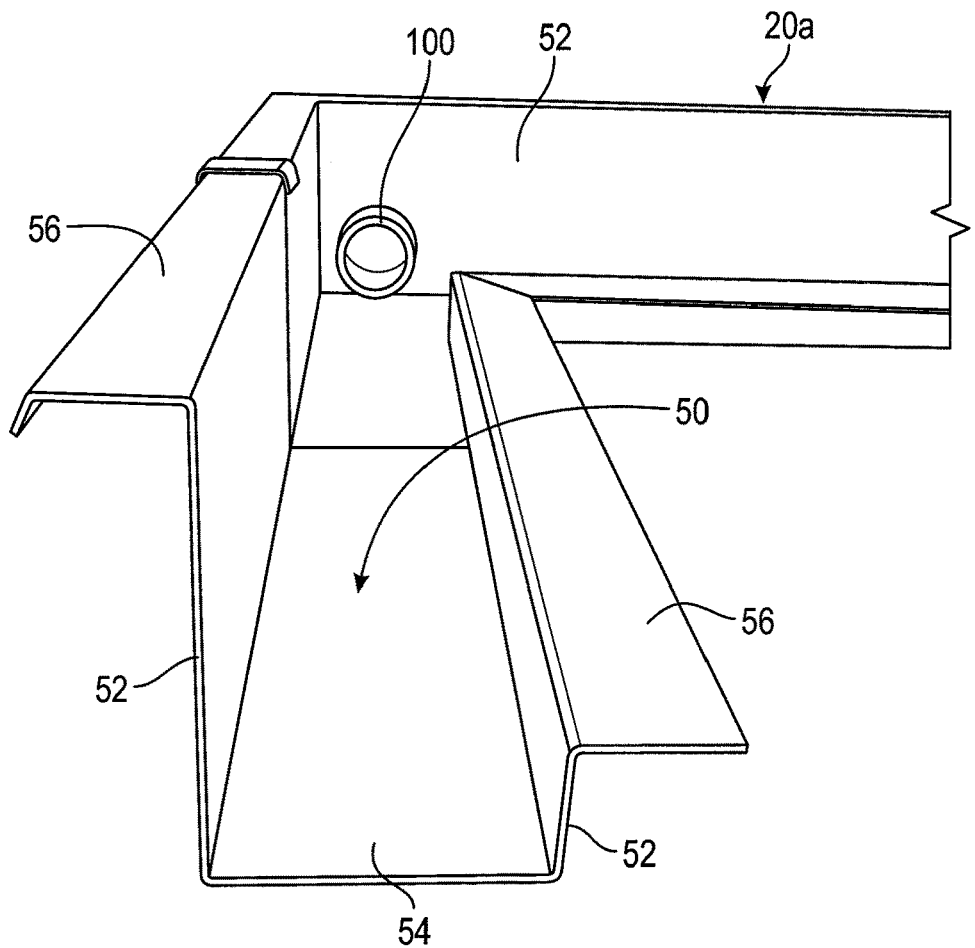
FIG. 24 is a side, partial perspective view of the oil containment system of the present invention.
Figure 25:
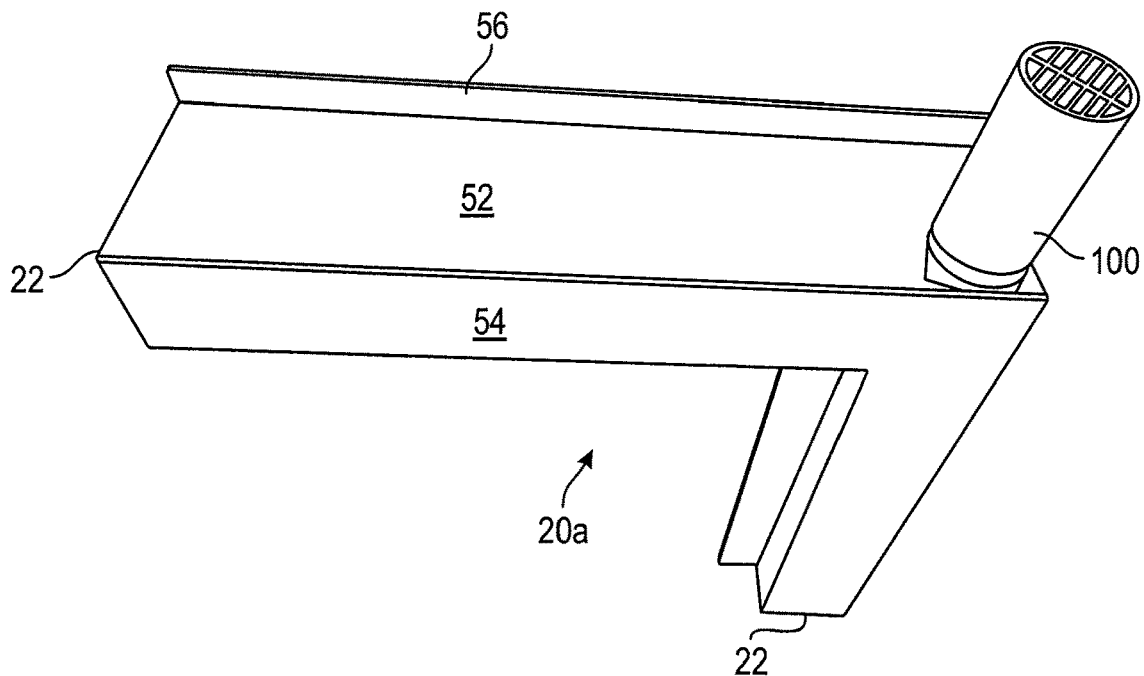
FIG. 25 is a bottom perspective view of the oil containment system of the present invention.

A discriminative outlet 100 may be disposed within a sidewall 52 and may be a holding sleeve, containment bin, drainage pit, wall box, or any other oil-restrictive drain known by a person of ordinary skill in the art. In some embodiments, the discriminative outlet 100 may include a ball valve, gate valve, or other similar device, and may be used in further combination with a holding sleeve. As depicted in FIGS. 24 and 25, the discriminative outlet 100 is disposed at the end of sidewall 52 closest to the base 54. The holding sleeve may include an adsorbing/absorbing filtration media (which may be, e.g., a Petro-Plug™ as manufactured by Solidifications Products International, Inc. of North Branford, Conneticut) and may be inserted within the sleeve such that transformer mineral oil, natural ester-based fluid, and/or oil sheen will be absorbed/adsorbed by the filtration media within the holding sleeve, while water will completely traverse through holding sleeve, egressing the discriminative outlet 100 so as to provide a drainage system. In some embodiments, after the filtration media (like that of the Petro-Plug™) adsorbs oil, the filtration media may chemically harden, thereby preventing any further fluid entry within the oil containment system. This is advantageous, since it would indicate when a transformer is in need of maintenance. In the case of a wall box (which may be, e.g., a Petro-Plug™ wall box), water may similarly traverse the layers of filtration media, pre-filter, and other components while simultaneously absorbing/adsorbing any transformer mineral oil, natural ester-based fluid, and/or oil sheen within its stored filtration media located within an internal cavity of the wall box. As shown in FIGS. 14A to 14C, the discriminative outlet comprises a wall box 100' having a fluid inlet 104, a grated fluid outlet 106, and a filtration media 108 within the wall box 100' and adjacent to the grated fluid outlet 106. The casing surrounding wall box 100' may be angled with respect to the horizon when placed on a containment unit sidewall 52 to promote water drainage, and may also include a gasket 102 surrounding the fluid inlet 104 disposed on the box flange 110. The wall box 100' may be secured to the oil containment system by way of a locking tab 112, or may be secured to the sidewalls using fasteners, or welded thereto. In some embodiments, like those depicted in FIG. 16, the opening 116 along the sidewall 52 may further include slotted groove projections 118 for receiving the box flange 110, and a cantilevered platform 114 to support the wall box 100' along its base after insertion.

Figure 17:
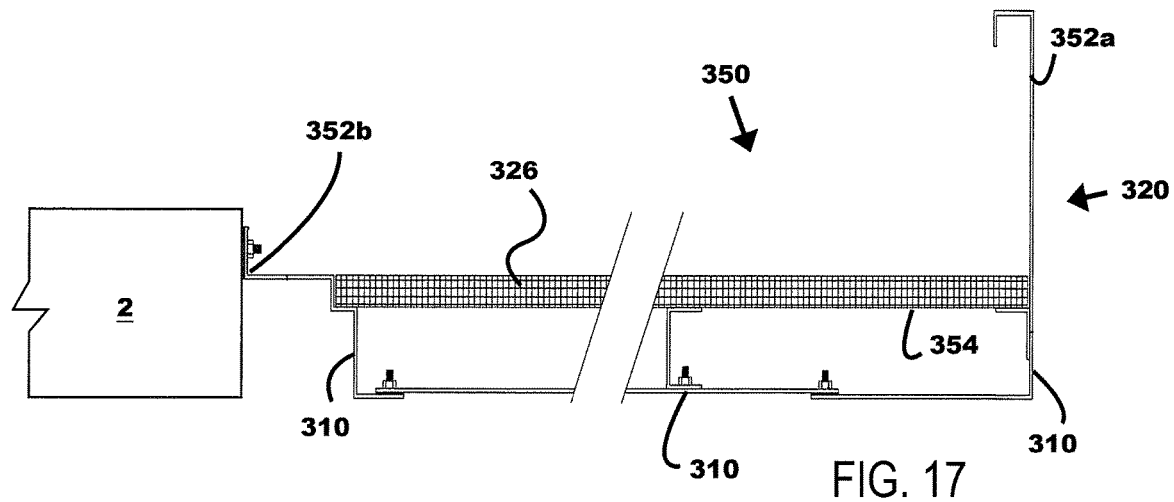
FIG. 17 is a side elevational view of an alternate embodiment of the oil containment system of the present invention in which the containment units are secured to raised sidewalls of the transformer pad.
Figure 18:
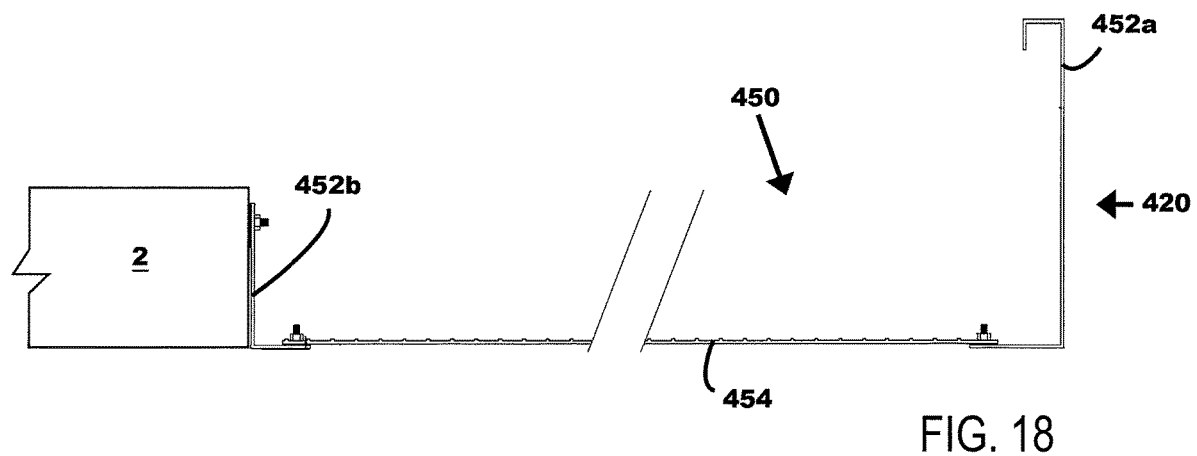
FIG. 18 is a side elevational view of the alternate embodiment of the oil containment system of the present invention of FIG. 17.

Turning now to FIGS. 17 and 18, an alternate embodiment of the oil containment system is shown in which the containment units are secured to raised sidewalls of the transformer pad without the need for flange extension on the containment unit sidewalls to secure the containment units to the pad. As shown in FIG. 17, oil containment unit 320 includes inner sidewall 352b which is secured to sidewall of pad 2. Both sidewalls 352a,b as well as base 354 form sump 350, which may further support a grate member 326 to facilitate walking along the containment unit 320. Containment units 320 may be elevated above grade by a platform support 310 which may be anchored into the ground using stakes, bolts, or similar materials. In FIG. 18, the containment unit 420, specifically the base 454 may be placed at grade or ground-level, and may be secured thereto using similar fastening methods. The sump 450 formed between sidewalls 452 may similarly include a diamond plating, rubberized coating, or similar surfacing necessary to allow the migration of water while preventing migration of transformer mineral oil, natural ester-based fluid, and/or oil sheen trapped within water. In some embodiments, one or more of the containment units may be placed below grade. Optionally, the sidewall of the pad may include a gasket, or fabric liner which can be placed between the pad and the containment units to provide a further seal between the oil containment pad sidewall and the oil containment system. While the embodiments depicted secure the containment units directly to the edge of the pad, any method of attachment may be utilized which provides a fluid-tight seal between the containment units and the pad. For example, threaded bolts or similar fasteners may first be secured to the pad sidewalls, and received within openings in the containment unit sidewalls before secured using any combination of nuts, or O-rings to establish a fluid-tight seal.

Turning now to FIGS. 19 to 22, to prevent the migration of oil out of the oil containment system, while simultaneously allowing the egress of water from the system, an embodiment of the present invention may utilize an oil containment insert system or barrier tray 200. Barrier tray 200 is typically sized to fit within the sump portion 50 of the containment units 20, and may be disposed on the base 54 or even on the support projections 58 in lieu of grate member 26 or even in addition thereto. The barrier trays 200 are typically made of aluminum, though other metallic or even polymer-based materials may be utilized. As depicted in FIG. 19C, barrier tray 200 is an open-top framed construction formed from grated base 212, and frame members 216 extending from the outside edges of the grated base 212. The grated base 212 may be a diamond cut metal grate, and may be secured to frame members 216 by welding or other means. While the barrier tray 200 is preferably rectangular, other shapes are not meant to be precluded. The ends of frame members 216 opposite the grated base end further include sealing flanges 218 along the length thereof (the x-axis as depicted in FIGS. 19A to 19C) as well as an inset or lower flange 218' and a connecting flange 214 extending along the tray width (the y-axis as depicted in FIGS. 19A to 19C). In establishing a connection between two or more barrier trays 200, the barrier trays are aligned along the x-axis such that the connecting flange 214 of one barrier trays is placed adjacent the inset flange 218'. Inset flange 218' is disposed slightly lower along the z-axis of the barrier tray 200, allowing the connecting flange 214 to be placed atop of the inset flange 218' such that the top surface of the connecting flange 214 of one barrier tray 200 is approximately the same vertical height of the remaining flanges 218, 214 on the adjacent tray. To ensure proper sealing, the underside of the connecting flange portion 214 includes a gasket 215.

After connection between two barrier trays 200, a downward force 230 is applied to the gasket to provide the liquid seal. Downward force 230 may be applied by the weight of the flange portion 214, or by some other force, such as a fiberglass tray cover 250, grate member 26, or the like. While the barrier trays depicted in FIGS. 19 to 22 have a connecting flange and inset flange on opposing sides, this is for exemplary purposes only. The barrier trays of the present invention may be constructed having no inset or connecting flange on either side or only a single side which incorporates the inset or connecting flange. Similarly, the barrier trays may also have two side with the inset flange or connecting flange. In some embodiments, the connecting or inset flanges may be disposed along the length (x-axis) of the barrier trays, allowing for connecting adjacent trays along 90-degree or similar angles. The barrier trays 200 may further include a gasket along the length, disposed on the underside of the flange 218. The barrier trays may be connected using a bead of construction adhesive, or any other form of adhesive on all edges thereof. While the barrier trays are described in tandem with the oil containment system of the present invention, other applications are not meant to be precluded. Other trench area applications, such as substations are not meant to be precluded, and would provide for dirt filters while also provide water drainage and oil containment applications.

Figure 19A:
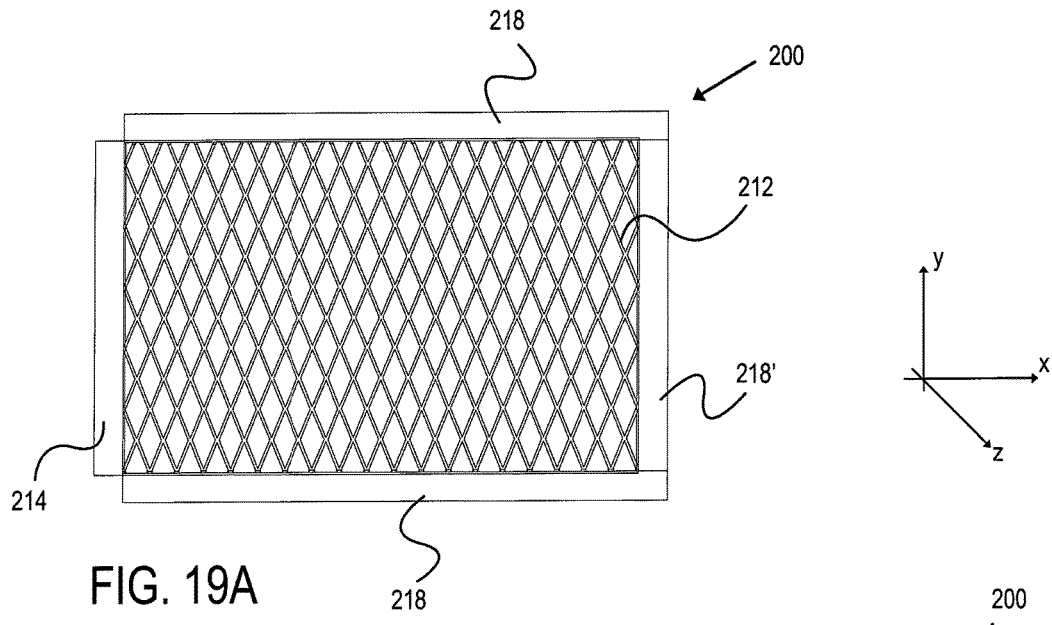
FIG. 19A is a top plan view of an oil containment insert system of the present invention.
Figure 19B:
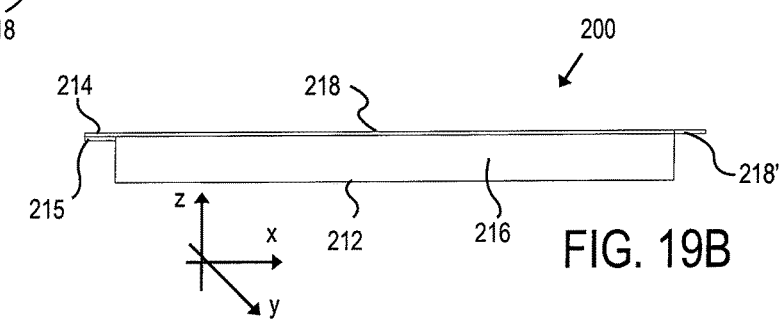
FIG. 19B is a side elevational view of an oil containment insert system of the present invention.
Figure 19C:
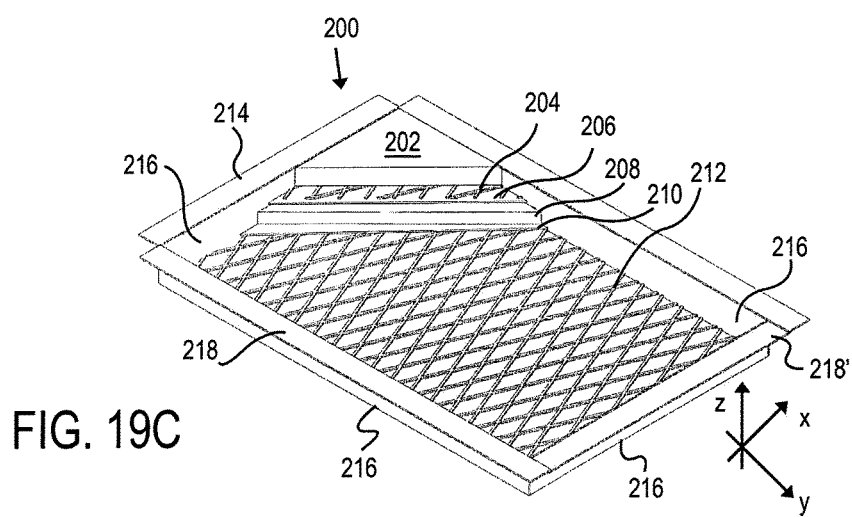
FIG. 19C is a perspective view of an oil containment insert system of the present invention.
Figure 20:
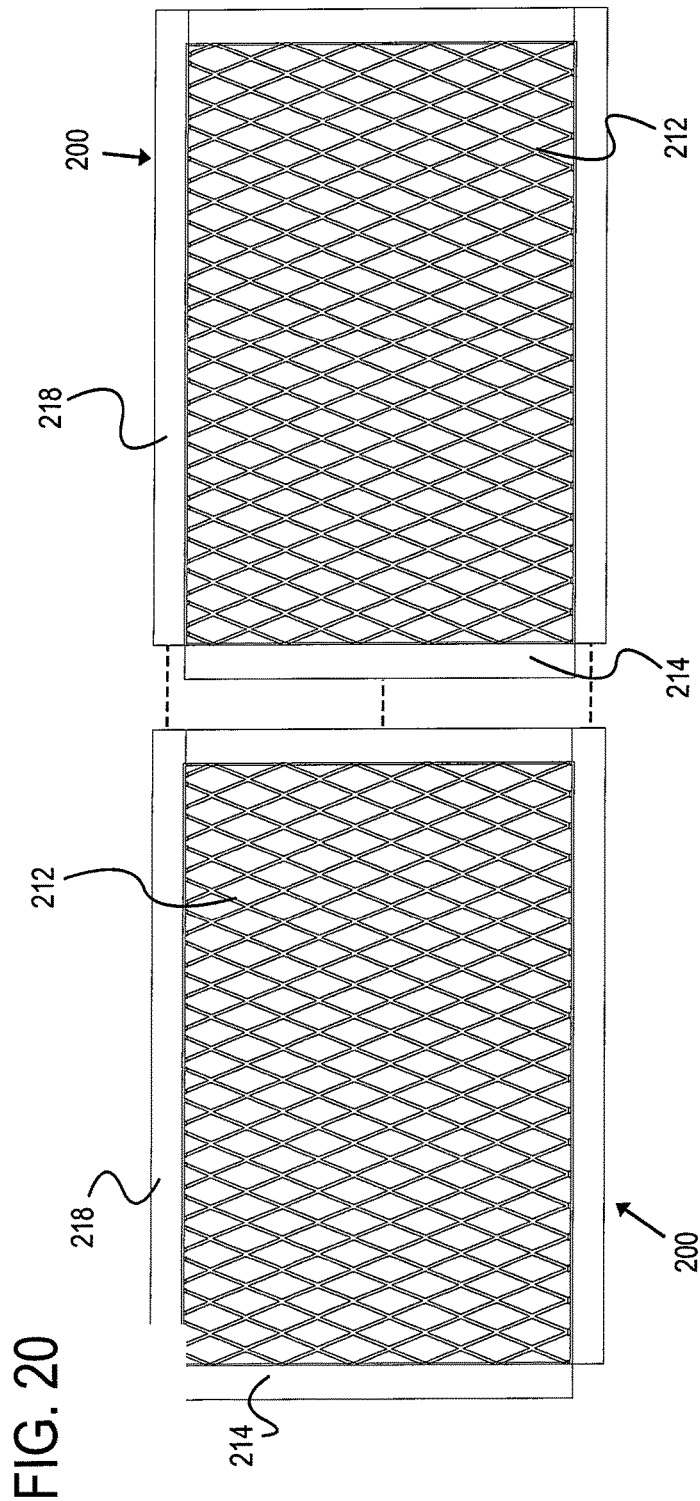
FIG. 20 is a top plan view showing the interconnection between two adjacent oil containment insert systems of FIG. 19.
Figure 21:
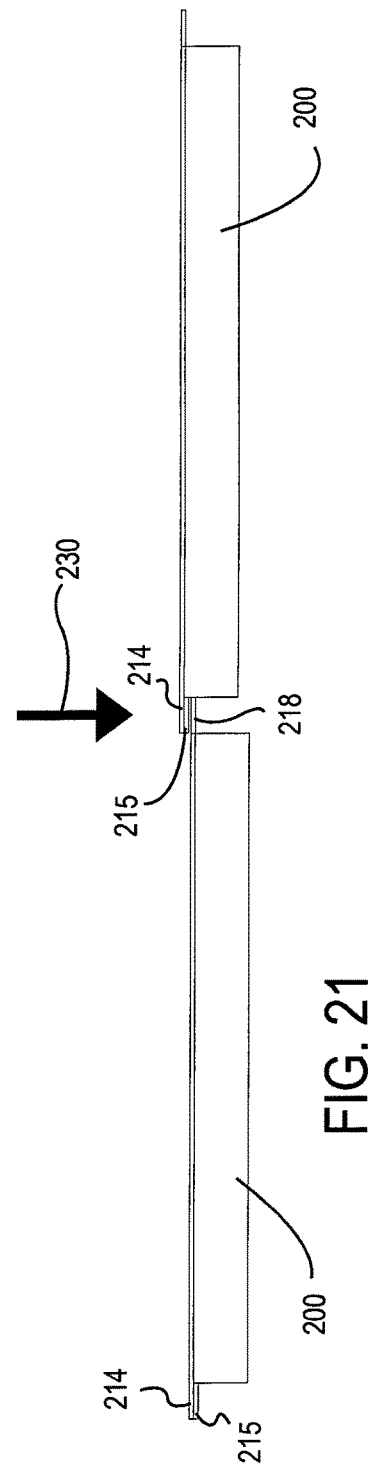
FIG. 21 is aside elevational view of the two adjacent oil containment insert systems of FIG. 20 after interconnection.

The materials disposed on top of the grated base 212 within the interior of the barrier tray 200 for oil containment are depicted in layered depiction of FIG. 19C. A layer of adsorbent fabric 210 is first placed adjacent to the grated base 212, and may be any lipophilic fabric which would be used by a person of ordinary skill in the art. Next, an adsorbent filtration media 208 is placed adjacent adsorbent fabric 210, which may be, for example "OIL BOND" of Solidification Products International, Inc. In application, the media layer will rapidly turn into a solid cohesive material that is removable after the adsorption of oil from water. The media layer 208 may be compressed into a filter cake, and is contained on the top surface by a poly floss layer 206. To further compress media layer 208 into a filter cake, a top compression layer 204 is placed atop the poly floss layer 206. Top compression layer 204 may be an aluminum grating or other material of sufficient density to apply a compression force to the media layer 208, and may further be tack welded along the tray frame members to ensure the secure all of the adsorbent layers within the barrier tray 200, thereby preventing any shifting. Atop compression layer 204, a prefilter layer 202 is placed, which may be a poly batting sheet similar material to prevent dirt and debris from entering the barrier tray 200. As a result, the lifespan of the media within the barrier tray can increase, and little if any maintenance or upkeep is required throughout the lifespan.

In some pad operations, the oil-filled equipment will include a throat opening within the pad which conduit may be run from below the pad surface up through the pad for connection with the oil-filled equipment. While these conduits will vary in size, these pad throats will typically include multiple conduits extending therethrough, requiring a throat opening which is sufficiently sized to accommodate the conduit. While not intending to be limiting, but by way of example, a pad which has dimensions of 8 ft×8 ft may include a throat opening of 2 ft×3 ft. In these situations, the oil containment system may utilize any of the embodiments described above to provide an oil containment system to the pad throat. Preferably, the method of installation would include an adsorbent media or discriminative outlet which would ensure oil cannot egress the pad via the throat opening.

It should be understood that the above-mentioned features of the oil containment system may be used in combination with any other features. For instance, the exemplary oil containment system depicted in FIG. 15 utilizes a discriminative outlet 100 incorporating a holding sleeve and another discriminative outlet wall box 100' while further utilizing barrier trays 200 within the sump 50. Similarly, any attachment scheme may be utilized to suite the pad mounted transformer. As shown in the exemplary FIG. 15, the interior flange extension 56b is mounted along a side edge of the pad 2, and further incorporates support structure 310. Thus, the oil containment system may be designed based on the overall structure of the transformer mounted pad 2, and the surrounding environment.

Thus, the present invention provides one or more of the following advantages: an oil containment system which may be retrofit to an existing transformer pad in a less costly and more efficient manner. The process for installing oil containment around a pad mounted transformer is also improved in that it does not need to disturb the surrounding environment. The oil containment system may be mounted directly on the transformer pad and may accommodate different configurations to provide total oil containment to transformers of varying sizes, and installation of the oil containment system does not inhibit any further maintenance work which may need to be completed on the transformer.

While the present invention has been particularly described, in conjunction with one or more specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

The invention claimed is:
1. An oil containment system for a transformer mounted on a transformer pad, comprising:
 a plurality of interlocking open-topped containment units, each of said plurality of containment units comprising:
  a base section, a sump formed with two vertically-aligned sidewalls, a first end, and a second end;
  said sidewalls having support struts extending across said sump;
  a grate member spanning said sump and supported on said support struts;
  at least one of said first end and said second end including an interlocking member comprising a connecting member or a receiving member, said connecting member sized to be placed within said receiving member sized such that said plurality of containment units are interlocked; and
 a discriminative outlet disposed within an opening in said sidewall of at least one of said plurality of containment units, said discriminative outlet including a filtration media for adsorbing oil from a fluid and subsequently blocking flow of oil through said discriminative outlet;
 wherein said plurality of interlocking open-topped containment units are secured to said transformer pad around a peripheral edge to restrict the migration of oil to an outside portion of said oil containment system.

2. The oil containment system of claim 1, wherein one of said sidewalls includes a flange extension on a top edge of said sidewall extending in a direction opposite said sump, such that said flange extension is securable to said peripheral edge of said transformer pad.

3. The oil containment system of claim 1, wherein a first of said sidewalls has a height greater than a second of said sidewalls to contain a volume of oil greater than said sump when said oil containment system is secured to said transformer pad.

4. The oil containment system of claim 1, wherein said discriminative outlet comprises a wall box having a wall box casing extending from a grated base, an internal cavity, and a filtration media within said wall box for adsorption/absorption of oil.

5. The oil containment system of claim 4, wherein said wall box further includes a box flange surrounding an upper edge of said wall box casing at an end of said wall box opposite said grated base, said box flange extending outwardly from said wall box internal cavity in a direction perpendicular to said wall box casing, and wherein said opening in said sidewall includes a slotted groove for receiving the box flange and said opening includes a cantilevered platform to support said wall box.

6. The oil containment system of claim 1, wherein said discriminative outlet comprises a holding sleeve including a filtration media for adsorption/absorption of oil.

7. The oil containment system of claim 1 wherein said sump may further include an oil containment insert system comprising a plurality of barrier trays including an oil adsorbent filtration media.

8. The oil containment system of claim 1 further including a shroud removably securable to a top edge of said sidewalls via a shroud connecting channel to encapsulate said plurality of interlocking, open-topped containment units, said shroud comprising a ceiling, two slanted shroud sidewalls extending from said ceiling, said connecting channel opposite said ceiling, and an opening along one of said slanted shroud sidewalls to permit the ingress of fluid into said containment unit sump.

9. The oil containment system of claim 1, wherein said containment unit may be secured to said transformer pad around the peripheral edge such that said base section is at grade.

10. The oil containment system of claim 1, wherein said containment unit may be secured to said transformer pad around the peripheral edge such that said base section is below grade.

11. The oil containment system of claim 1, wherein said containment unit may be secured to said transformer pad around the peripheral edge such that said base section is above grade and wherein said plurality of interlocking open-topped containment units may be supported by a platform support secured to an underside of said base section.

12. A method of installing an oil containment system for a pad-mounted transformer, comprising:
provided a plurality of interlocking, open-topped containment units, each of said plurality of containment units comprising:
a base section, a sump formed with two vertically-aligned sidewalls, a first end, and a second end;
said sidewalls having support struts extending across said sump;
a grate member spanning said sump and supported on said support struts;
at least one of said first end and said second end including an interlocking member comprising a connecting member or a receiving member, said connecting member sized to be placed within said receiving member sized for interlocking said plurality of containment units;
providing a discriminative outlet disposed within an opening of said sidewall of at least one of said plurality of containment units, said discriminative outlet including a filtration media for adsorbing and/or absorbing oil from a fluid;
connecting the at least one of said first end and said second end of a first of said plurality of containment units to the at least one of said first end and said second end of a second of said plurality of containment units via said connecting member and said receiving member such that said first and second plurality of containment units are adjacent each other and form a fluid-tight seal;
securing said plurality of containment units to said transformer pad around a peripheral edge;
wherein said oil containment system may restrict migration of oil to an outside portion of said oil containment system and wherein said oil containment system may provide migration of water to said outside portion.

13. The method of claim 12 wherein said containment unit may be secured to said transformer pad around the peripheral edge such that said base section is at grade.

14. The oil containment system of claim 12, wherein said containment unit may be secured to said transformer pad around the peripheral edge such that said base section is above grade and wherein said plurality of interlocking open-topped containment units may be supported by a platform support secured to an underside of said base section.

15. The oil containment system of claim 12, wherein the method further comprises:
providing a shroud removably securable to a top edge of said sidewalls via a shroud connecting channel to encapsulate said plurality of interlocking, open-topped containment units, said shroud comprising a ceiling, two slanted shroud sidewalls extending from said ceiling, said connecting channel opposite said ceiling, and an opening along one of said slanted shroud sidewalls to permit the ingress of fluid into said containment unit sump; and
placing said shroud connecting channel to said top edge of said sidewalls such that said shroud is removably secured to said plurality of said plurality of interlocking, open-topped containment units and wherein said shroud encapsulates said plurality of interlocking, open-topped containment units.

16. An oil containment insert system comprising:
a frame member including vertical sidewalls with top edges extending along a length and a width of said frame member;
a grated base secured to said frame member approximately perpendicular to said vertical sidewalls, said vertical sidewalls and base plate forming an internal cavity;
sealing flanges extending outwardly from said top edges and away from said cavity along said length;
a connecting flange extending outwardly from said top edges and away from said cavity along said width;
an inset flange extending outwardly from said top edges and away from said cavity along said width;
said internal cavity including a grated compression layer secured thereto said internal cavity further including an adsorbent fabric layer adjacent said grated base, a poly floss layer adjacent said compression, and an oil adsorbent filtration media layer therebetween;

wherein said oil containment insert system provides for migration of water between said grated compression layer and said grated base and restricts migration of oil between said grated compression layer and said grated base.

17. The oil containment insert system of claim 16 wherein said sealing flanges contain a gasket on an underside thereof to facilitate a fluid-tight seal upon placement of said insert system within a sump or trench.

18. The oil containment insert system of claim 16 further including a prefilter layer adjacent said grated compression layer.

19. The oil containment insert system of claim 16 wherein the connecting flange may be placed onto the inset flange of an adjacent oil containment insert system to create a fluid-tight seal therebetween.

* * * * *